United States Patent
Barnes et al.

(10) Patent No.: US 12,321,698 B2
(45) Date of Patent: Jun. 3, 2025

(54) TEXT CLASSIFICATION VIA TERM MAPPING AND MACHINE-LEARNING CLASSIFICATION MODEL

(71) Applicant: Capital One Services, LLC, McLean, VA (US)

(72) Inventors: Catherine Barnes, Glen Allen, VA (US); Jennifer Honermann, Glen Allen, VA (US); Peter Todd Akers, North Potomac, MD (US)

(73) Assignee: Capital One Services, LLC, McLean, VA (US)

(*) Notice: Subject to any disclaimer, the term of this patent is extended or adjusted under 35 U.S.C. 154(b) by 268 days.

(21) Appl. No.: 17/864,872

(22) Filed: Jul. 14, 2022

(65) Prior Publication Data
US 2024/0020474 A1    Jan. 18, 2024

(51) Int. Cl.
G06F 40/279    (2020.01)
G06N 5/022    (2023.01)

(52) U.S. Cl.
CPC ........... G06F 40/279 (2020.01); G06N 5/022 (2013.01)

(58) Field of Classification Search
CPC ....... G06F 40/279; G06N 5/022; G06N 20/00
USPC .......................................................... 704/9
See application file for complete search history.

(56) References Cited

U.S. PATENT DOCUMENTS

| | | | |
|---|---|---|---|
| 7,392,185 B2 | 6/2008 | Bennett | |
| 9,336,192 B1 | 5/2016 | Barba et al. | |
| 9,615,136 B1 | 4/2017 | Emery et al. | |
| 10,354,009 B2 * | 7/2019 | Liang | G06F 16/35 |
| 10,394,953 B2 | 8/2019 | Satyavarta et al. | |
| 10,404,745 B2 | 9/2019 | Verma et al. | |
| 10,671,816 B1 | 6/2020 | Zhang et al. | |
| 10,678,769 B2 * | 6/2020 | Karmakar | G06F 16/2272 |
| 10,891,699 B2 | 1/2021 | Admon | |
| 10,949,611 B2 | 3/2021 | Brake et al. | |

(Continued)

FOREIGN PATENT DOCUMENTS

| | | |
|---|---|---|
| CN | 106610990 A | 5/2017 |
| CN | 108052505 A | 5/2018 |

(Continued)

OTHER PUBLICATIONS

Bedi "A guide to Text Classification(NLP) using SVM and Naive Bayes with Python", Nov. 9, 2018, pp. 1-10, printed Aug. 4, 2021.

(Continued)

*Primary Examiner* — Paras D Shah
*Assistant Examiner* — Fouzia Hye Solaiman
(74) *Attorney, Agent, or Firm* — Banner & Witcoff, Ltd.

(57) ABSTRACT

A method, apparatus, and computer-readable medium are described that identify subject matter of text using identified groups and a machine-learning model. Using the combination of the identified subject matter and the machine-learning model, classifications may be adjusted over time. Based on the adjusted classifications, the machine-learning model may be retrained to better classify previously unclassified text. One or more benefits may include better summarization of text documents and/or better training of machine-learning models that are then used to assist in the summarization of the text documents. The resulting classifications may be used to improve resource allocations for future tasks.

18 Claims, 15 Drawing Sheets

| Terms | Primary Category/Group | Secondary Category/Group | Rank |
|---|---|---|---|
| production support | Support | Production | 1 |
| change order | Deployment | Support | 2 |
| unit test | Testing | Development | 3 |
| production release | Deployment | Production | 4 |
| error code remediation | Vulnerability Remediation | Error Code | 5 |
| stress test | Disaster Recovery | Development | 6 |
| error code scan | Vulnerability Remediation | Error Code | 7 |
| stress test participation | Disaster Recovery | Development | 8 |
| ... | ... | ... | ... |

601     602     603     604

(56) References Cited

U.S. PATENT DOCUMENTS

| | | | |
|---|---|---|---|
| 2012/0116766 | A1 | 5/2012 | Wasserblat et al. |
| 2012/0166180 | A1 | 6/2012 | Au |
| 2013/0253910 | A1 | 9/2013 | Turner et al. |
| 2015/0046452 | A1 | 2/2015 | Agrawal et al. |
| 2016/0179868 | A1* | 6/2016 | Rajpathak ............... G06F 40/30 707/690 |
| 2016/0188566 | A1* | 6/2016 | Jifroodian-Haghighi .................... G09B 5/02 704/10 |
| 2016/0189034 | A1 | 6/2016 | Shakeri et al. |
| 2016/0189035 | A1 | 6/2016 | Shakeri et al. |
| 2016/0189036 | A1 | 6/2016 | Shakeri et al. |
| 2017/0011029 | A1 | 1/2017 | Chatterjee et al. |
| 2017/0060996 | A1 | 3/2017 | Das |
| 2018/0239959 | A1* | 8/2018 | Bui .......................... G06F 16/93 |
| 2019/0102802 | A1 | 4/2019 | Tuschman et al. |
| 2020/0065716 | A1* | 2/2020 | Aharonov ............... G06N 20/00 |

FOREIGN PATENT DOCUMENTS

| | | |
|---|---|---|
| GB | 2388940 A | 11/2003 |
| WO | 2014183089 A1 | 11/2014 |
| WO | 2020012483 A1 | 1/2020 |
| WO | 2020236407 A1 | 11/2020 |

OTHER PUBLICATIONS

Lin et al. "Global Sensor Deployment and LocalCoverage—Aware Recovery Schemes for Smart Environments", IEEE Transactions on Mobile Computing, vol. 14, No. 7, Jul. 2015, pp. 1382-1396.

"Using Amazon Aurora global databases", Amazon Aurora User Guide for Aurora, Getting started with Aurora global databases, pp. 219-221. Undated.

"Amazon Aurora: User Guide for Aurora", pp. 1-1527. Undated.

Hassan et al. "Credibility Detection in Twitter Using Word N-gram Analysis and Supervised Machine Learning Techniques", International Journal of Intelligent Engineering and Systems, vol. 13, No. 1, 2020, http://www.inass.org/, pp. 291-300.

"CS388: Natural Language Processing", Lecture 7: Word Embeddings, The University of Texas Austin, pp. 1-11. Undated.

Jones "2. document clustering", https://cran.r-project.org/web/packages/textmineR/vignettes/b_document_clustering.html, pp. 1-4, Jun. 27, 2021.

Mikolov et al. "Exploiting Similarities among Languages for Machine Translation", arXiv:1309.4168v1 [cs.CL] Sep. 17, 2013, pp. 1-10.

Kruczek et al. "Are n-gram Categories Helpful in Text Classification?", ICCS 2020, LNCS 12138, pp. 524-537, 2020, https://doi.org/10.1007/978-3-030-50417-5_39.

Shaikh "Machine Learning, NLP: Text Classification using scikit-learn, python and NLTK.", Jul. 23, 2017, pp. 1-10, printed Aug. 21, 2021.

"Overview of backing up and restoring an Aurora DB cluster", Amazon Aurora User Guide for Aurora: Overview of backing up and restoring, pp. 481-483. Undated.

Singh et al. "Intra News Category Classification using N-gram TFIDF Features and Decision Tree Classifier", www.ijsart.com, IJSART—vol. 4 Issue 3—Mar. 2018, pp. 508-514.

Rahman et al. "An Investigation and Evaluation of N-Gram, TF-IDF and Ensemble Methods in Sentiment Classification", ICST Institute for Computer Sciences, Social Informatics and Telecommunications Engineering 2020, Published by Springer Nature Switzerland AG 2020, T. Bhuiyan et al. (Eds.): ICONCS 2020, LNICST 325, pp. 391-402, 2020. https://doi.org/10.1007/978-3-030-52856-0_31.

Anala "Text Classification Using TF-IDF", Jul. 21, 2020, pp. 1-10, printed Aug. 4, 2021.

Poulston et al. "Using TF-IDF n-gram and Word Embedding Cluster Ensembles for Author Profiling", Department of Computer Science, University of Sheffield, UK, pp. 1-7. Presented at CLEF 2017, Sep. 11-14, 2017.

* cited by examiner

| Terms | Primary Category/Group | Secondary Category/Group | Rank |
|---|---|---|---|
| production support | Support | Production | 1 |
| change order | Deployment | Support | 2 |
| unit test | Testing | Development | 3 |
| production release | Deployment | Production | 4 |
| error code remediation | Vulnerability Remediation | Error Code | 5 |
| stress test | Disaster Recovery | Development | 6 |
| error code scan | Vulnerability Remediation | Error Code | 7 |
| stress test participation | Disaster Recovery | Development | 8 |
| ... | ... | ... | ... |

FIG. 6

TEXT CLASSIFICATION VIA TERM MAPPING AND MACHINE-LEARNING CLASSIFICATION MODEL

TECHNOLOGICAL FIELD

Aspects of the disclosure relate generally to classifying text.

BACKGROUND

Determining subject matter contained in text is tedious. While machine-based manipulations of the text may provide simplistic analyses including word frequencies and other calculatable values, collections of mere numbers fail to adequately enable one to identify the subject matter of the text. Further, where the text appears across multiple documents with limited quantities of text in each document, machine-based manipulations are inadequate to summarize the content of each document or summarize the collection of documents.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Aspects of the disclosure relate to identifying the subject matter of text using identified groups and a machine-learning model. Using one or more aspects, improved classification of text documents may be achieved. In some aspects, the machine-learning model may be retrained based on adjustments to the identified groups. In one or more aspects, the groups may be curated by individuals. In other aspects, the groups may be curated by another machine-learning classifier. In one or more aspects, the groups may be ordered to permit text associated with multiple groups to be identified with the higher higher-ranked group. One or more benefits may include better summarization of text documents and/or better training of machine-learning models that may be then used to assist in the summarization of the text documents.

Some implementations described herein relate to a computer-implemented method for the classification of text documents using a term model and a machine-learning model incorporating both user inputs and user feedback. The computer-implemented method may include receiving a grouping dataset comprising a terms field and a group field, wherein the group field comprises categories associated with terms in the terms field, with the categories having labels, and comparing adjacent terms of a first dataset with the terms field of the grouping dataset. The first dataset may comprise a plurality of documents. The method may further comprise identifying, for each of the plurality of documents and based on at least one adjacent term matching at least one term in the terms field, a category associated with the at least one term of the grouping dataset and generating a second dataset that may comprise one or more categories for each of the plurality of documents. The second dataset may comprise a subset of the plurality of documents that are not associated with the one or more categories. The method may further include training a machine-learning model using the second dataset, identifying, based on the trained machine-learning model, a category for each document in the subset, and causing one or more labels associated with the categories to be displayed for the second dataset including the subset.

In some aspects, the computer-implemented method may further include receiving the plurality of documents, wherein each document may comprise a name and a description and cleaning, via one or more processors, each description of each document, resulting in a cleaned document description, for each document, including a plurality of terms, associated with each document. The dataset may comprise a source field and a target field with the source field populated, from each document of the plurality of documents, with terms in the cleaned document description. The target field may be populated, from each document of the plurality of documents, with adjacent terms in the cleaned document description that immediately follow, in each document, the terms in the source fields.

In some aspects, the computer-implemented method may further include receiving an updated grouping dataset including the group field and the terms field, comparing adjacent terms of the first dataset with the terms field of the updated grouping dataset, and identifying, for each of the plurality of documents and based on at least one adjacent term matching at least one term in the terms field of the updated grouping dataset, a category associated with the at least one term of the updated grouping dataset. The method may further include generating a third dataset including one or more categories, from the updated grouping dataset, for each of the plurality of documents, wherein the third dataset may include a second subset of the plurality of documents that are not associated with the one or more categories from the updated grouping dataset. The method may further include training a machine-learning model using the third dataset, identifying, based on the trained machine-learning model, a category, from the updated grouping dataset, for each document in the second subset, and causing one or more labels associated with the categories, from the updated grouping dataset, to be displayed for the third dataset including the second subset. The group field may further include second categories associated with the terms in the terms field.

In some aspects, the computer-implemented method may further include identifying, for each of the plurality of documents and based on at least one adjacent term matching at least one term in the terms field, a second category associated with the at least one term of the grouping dataset and generating a third dataset including one or more second categories for each of the plurality of documents. The third dataset may comprise a second subset of the plurality of documents that are not associated with the one or more second categories. The method may further include training a second machine-learning model using the third dataset, identifying, based on the second trained machine-learning model, a category for each document in the second subset, and causing one or more second labels associated with one or more second categories to be displayed for the third dataset including the second subset. The grouping dataset may further include a rank field.

In some aspects, the computer-implemented method may further include identifying, for each document in the second dataset and based on categories from the grouping dataset, the highest ranked categories of each document in the second dataset. The causing one or more labels associated with the one or more categories to be displayed may further include causing the label of the highest ranked category to be displayed for the documents of the second dataset. The first dataset may include bigrams, trigrams, and/or n-grams from terms in the plurality of documents. The first dataset may further include a name field and a document description field.

In some aspects, the step of identifying the category associated with the at least one term of the grouping dataset may be based on at least one adjacent term from at least one of the name field or the document description field. The first dataset may further include a plurality of document-specific datasets. In some aspects, the model may include a term frequency-inverse document frequency (TF-IDF) transformer. The TF-IDF model may further include a machine-learning classification algorithm such as a support vector machine (SVM) classifier.

Additional aspects, configurations, embodiments and examples are described in more detail below.

BRIEF DESCRIPTION OF THE SEVERAL VIEWS OF THE DRAWINGS

The present disclosure is illustrated by way of example and not limited in the accompanying figures in which like reference numerals indicate similar elements and in which:

FIG. 6 depicts a list of terms and one or more categories for the terms;

Figure 1:
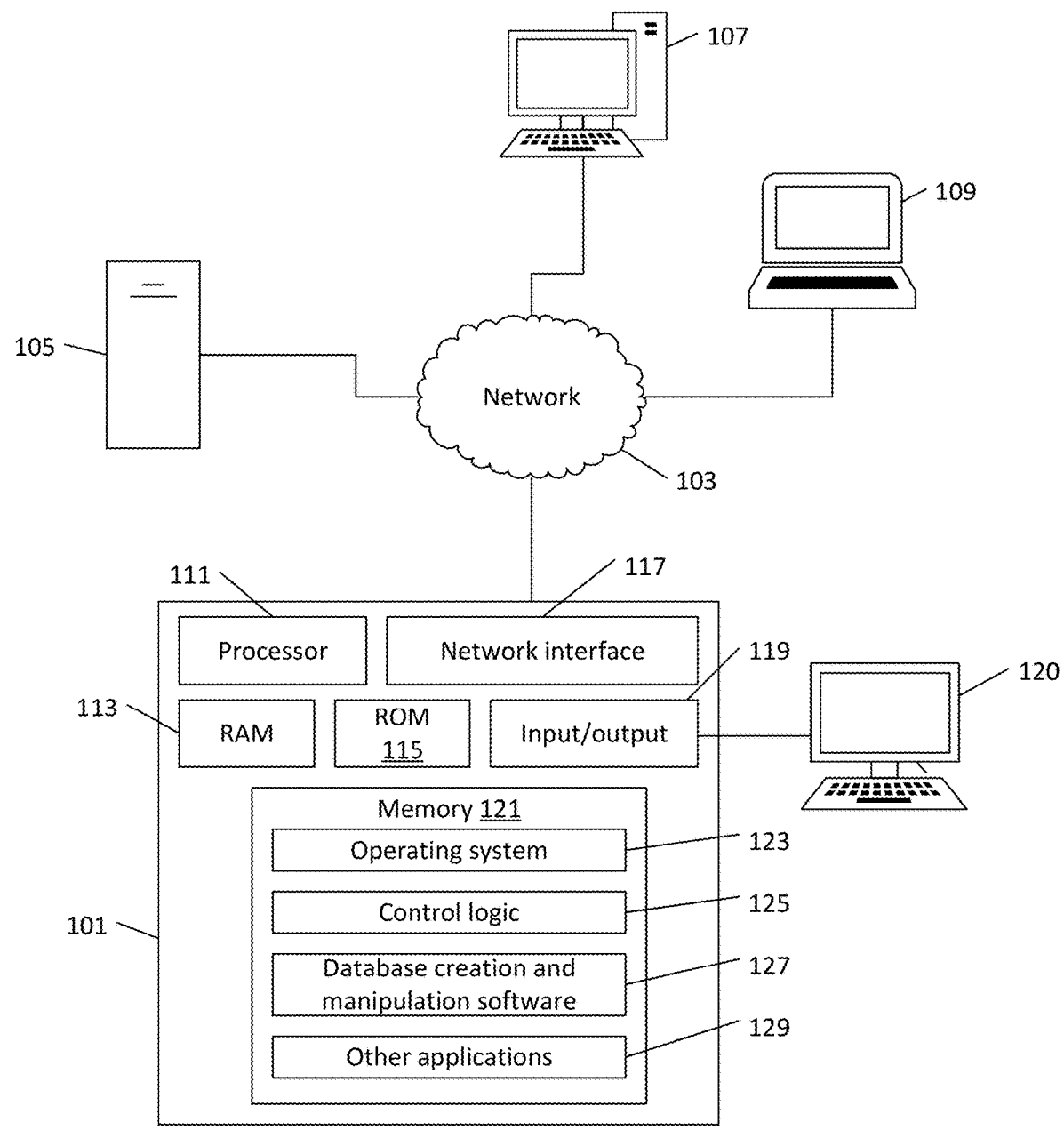
FIG. 1 depicts an example of a computing device and system architecture that may be used in implementing one or more aspects of the disclosure in accordance with one or more illustrative aspects discussed herein.

It will be recognized by the skilled person in the art, given the benefit of this disclosure, that the exact arrangement, sizes, and positioning of the components in the figures are not necessarily to scale or required.

DETAILED DESCRIPTION

Certain aspects relate to improving classifications of textual data. Software developers regularly document programs to permit others to better appreciate how their programs work. These developers may also describe, e.g., in textual snippets, how their code may be used in a broader software ecosystem. The textual snippets may comprise sentences, paragraphs, and/or combinations of various words used to describe a particular section of software code. The textual snippets may also comprise emails and or journal entries that identify items being addressed by the developers. As such, these emails and/or journal entries may provide a history of efforts spent on various topics. As used herein, the textual snippets may be referred to as individual stories. The corpus of stories may be relevant to one or more projects, issues for the software developers, specific clients, specific business units, and the like.

In one aspect, a machine learning classifier may be trained on a first set of stories and, based on the training, attempt to classify other stories. The results may be displayed on a user interface based on various metrics associated with the classifications. A difficulty that exists with machine learning classifiers is a difficulty in how the classifiers are trained. One or more aspects described herein improve processes for training machine learning classifiers by, in one or more examples, capturing one or more key aspects of the corpus and associating those aspects with individual words and/or phrases. For example, one or more aspects permit word pairs (e.g. bigrams) to be identified and associated with one or more key aspects. In another example, the number of words that make up a word set may be selectable to permit the word set to comprise three words (e.g. tri-grams) or any other number of words (e.g. referred to generally as n-grams). In one or more aspects, the stories may be cleaned before use. The cleaning may remove less significant words (e.g., articles), and replace words with other words (e.g., replacing various verb forms with intransitive forms or other forms and/or replacing some words with other words). The above cleaning techniques are only examples. Other cleaning techniques are known and may be used as described herein.

One or more aspects may generally relate to improving how stories may be summarized and those summaries displayed for consumption by others. Some of the advantages described herein include improving classifications from machine learning classifiers. Other advantages include tailoring the training of a machine learning classifier to specific genres of stories that would otherwise be convolved with other previous, less relevant classifications. Convolving disparate stories from unrelated projects may reduce the usefulness of the summaries.

In the following description of the various embodiments, reference is made to the accompanying drawings, which form a part hereof, and which are shown by way of illustration of various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. Any sequence of computer-implementable instructions described in this disclosure may be considered to be an "algorithm" as those instructions are intended to solve one or more classes of problems or to perform one or more computations. While various directional arrows are shown in the figures of this disclosure, the directional arrows are not intended to be limiting to the extent that bi-directional communications are excluded. Rather, the directional arrows are to show a general flow of steps and not the unidirectional movement of information. In the entire specification, when an element is referred to as "comprising" or "including" another element, the element should not be understood as excluding other elements so long as there is no special conflicting description, and the element may include at least one other element. In addition, the terms "unit" and "module", for example, may refer to a component that exerts at least one function or operation, and may be realized in hardware or software, or may be realized by a combination of hardware and software. In addition, terms such as " . . . unit", and " . . . module" described in the specification mean a unit for performing at least one function or operation, which may be implemented as hardware or software, or as a combination of hardware and software. Throughout the specification, the expression "at least one of a, b, and c" may include 'a only', 'b only', 'c only', 'a and b', 'a and c', 'b and c', and/or 'all of a, b, and c'.

Before discussing the concepts of the disclosure in greater detail, however, several examples of a computing device that may be used in implementing and/or otherwise providing various aspects of the disclosure will first be discussed with respect to FIG. 1. FIG. 1 illustrates one example of a computing device 101 that may be used to implement one or more illustrative aspects discussed herein. For example, the computing device 101 may, in some embodiments, implement one or more aspects of the disclosure by reading and/or executing instructions and performing one or more actions based on the instructions. In some embodiments, the computing device 101 may represent, be incorporated in, and/or include various devices such as a desktop computer, a computer server, a mobile device (e.g., a laptop computer, a tablet computer, a smart phone, any other types of mobile computing devices, and the like), and/or any other type of data processing device.

The computing device 101 may, in some embodiments, operate in a standalone environment. In others, the computing device 101 may operate in a networked environment. As shown in FIG. 1, various network nodes 101, 105, 107, and 109 may be interconnected via a network 103, such as the Internet. Other networks may also or alternatively be used, including private intranets, corporate networks, LANs, wireless networks, personal networks (PAN), and the like. Network 103 is for illustration purposes and may be replaced with fewer or additional computer networks. A local area network (LAN) may have one or more of any known LAN topologies and may use one or more of a variety of different protocols, such as Ethernet. Devices 101, 105, 107, 109, and other devices (not shown) may be connected to one or more of the networks via twisted pair wires, coaxial cables, fiber optics, radio waves, or other communication media. Additionally or alternatively, the computing device 101 and/or the network nodes 105, 107, and 109 may be a server hosting one or more databases.

As seen in FIG. 1, the computing device 101 may include a processor 111, RAM 113, ROM 115, network interface 117, input/output interfaces 119 (e.g., keyboard, mouse, display, printer, etc.), and memory 121. Processor 111 may include one or more computer processing units (CPUs), graphical processing units (GPUs), and/or other processing units such as a processor adapted to perform computations associated with database operations. Input/output 119 may include a variety of interface units and drives for reading, writing, displaying, and/or printing data or files. Input/output 119 may be coupled with a display such as display 120. Memory 121 may store software for configuring computing device 101 into a special-purpose computing device in order to perform one or more of the various functions discussed herein. Memory 121 may store operating system software 123 for controlling the overall operation of the computing device 101, control logic 125 for instructing the computing device 101 to perform aspects discussed herein, database creation and manipulation software 127, and other applications 129. Control logic 125 may be incorporated in and may be part of database creation and manipulation software 127. In other embodiments, the computing device 101 may include two or more of any and/or all of these components (e.g., two or more processors, two or more memories, etc.) and/or other components and/or subsystems not illustrated here.

Devices 105, 107, and 109 may have similar or different architecture as described with respect to the computing device 101. Those of skill in the art will appreciate that the functionality of the computing device 101 (or device 105, 107, 109) as described herein may be spread across multiple data processing devices, for example, to distribute processing load across multiple computers, to segregate transactions based on geographic location, user access level, quality of service (QOS), etc. For example, devices 101, 105, 107, 109, and others may operate in concert to provide parallel computing features in support of the operation of control logic 125 and/or software 127.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) Python, JavaScript, or an equivalent thereof. The computer-executable instructions may be stored on a computer-readable medium such as a hard disk, optical disk, removable storage media, solid-state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer-executable instructions and computer-usable data described herein. Various aspects discussed herein may be embodied as a method, a computing device, a data processing system, or a computer program product. Having discussed several examples of computing devices that may be used to implement some aspects as discussed further below, the discussion will now turn to a method for classifying textual data using a machine-learning classifier.

Figure 2:
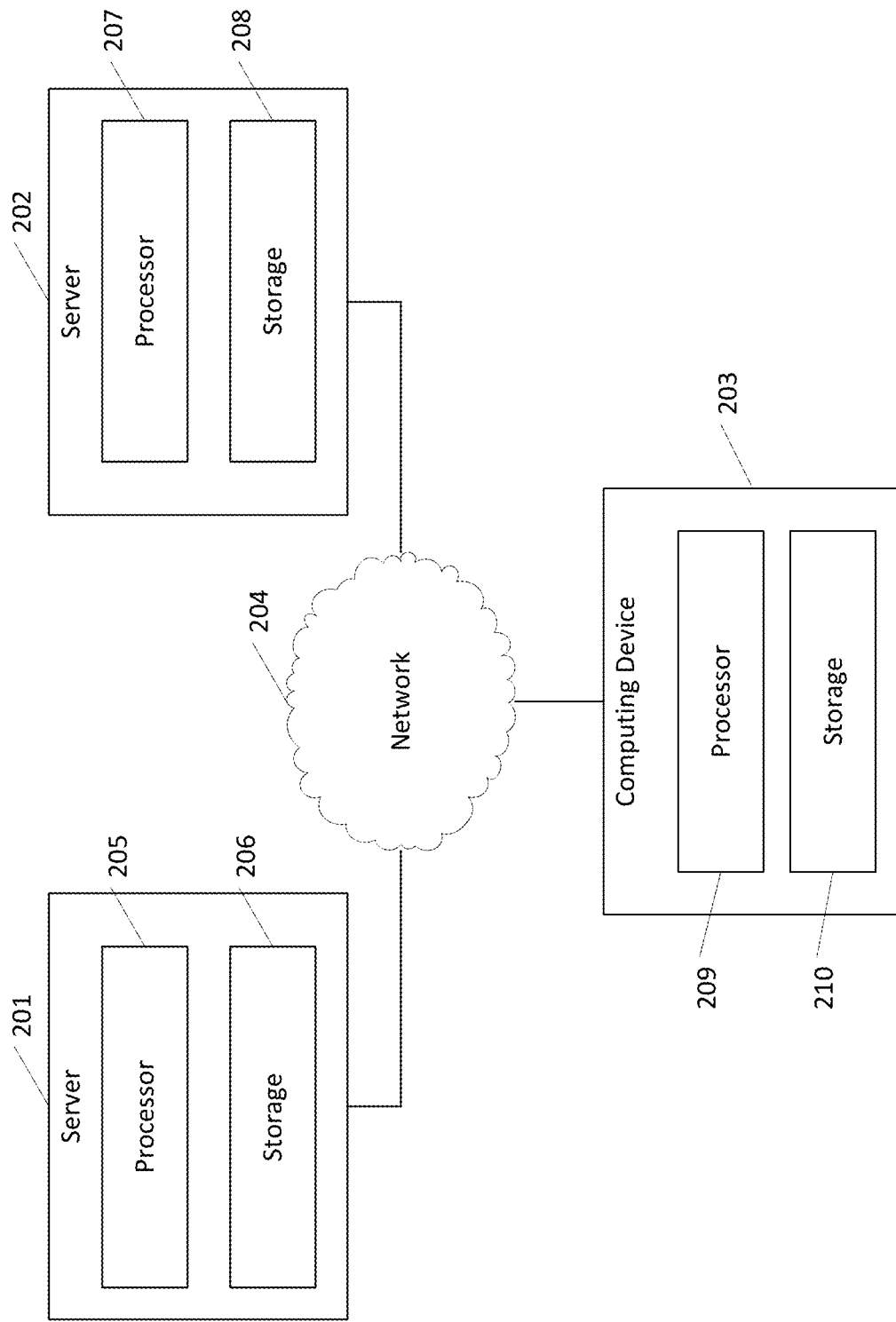
FIG. 2 depicts a block diagram of an environment in which systems and/or methods described herein may be implemented.

FIG. 2 is a block diagram of an environment in which systems and/or methods described herein may be implemented. As shown in FIG. 2, the environment may include servers 201 and 202 and a computing device 203 connected by a network 204. The devices, servers, and network may be interconnected via wired connections, wireless connections, or a combination of wired and wireless connections. The server 201 may be directed toward receiving files relating to activities from computing device 203 and then sending the files to server 202 for processing.

The network 204 may include one or more wired and/or wireless networks. For example, network 204 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more servers shown in FIG. 2 may be implemented within a single server, or a single server shown in FIG. 2 may be implemented as multiple, distributed servers or in a cloud-based computing environment. Additionally, or alternatively, a set of devices (e.g., one or more devices) of the environment 203 may perform one or more functions described as being performed by another set of devices of the environment. Network 204 may be represented as a single network but may comprise combinations of other networks or subnetworks. In one or more examples, a data stream (not shown) may be received by server 201, where server 201 is a data store for received information. The data stream may also be received by server 202. The server 202 may parse the incoming data stream for stories and prepare the stories for classification. The server 202 may associate one or more categories with various stories based on those stories containing one or more word sets found in a grouping dataset where the grouping dataset includes a terms field and a group field. The group field may include categories associated with the terms in the terms field. Using the grouping dataset, the server 202 may apply categories to various stories. Where multiple categories may be applicable for any given story, a category or categories applied may be selected based on an order of categories (or hierarchy or category ranking or the like) provided in the grouping dataset. Next, a machine learning model may be trained to classify stories based on terms found in each story where the classifications may comprise various categories from the grouping dataset. The trained machine learning model may then be used by server 202 to classify other stories using the categories available from the grouping dataset. In one or more examples, the grouping dataset may be curated based on results from the classification predictions of the trained machine learning model. The modification of the grouping dataset may comprise further refinements of terms associated with categories where the refinements may include the removal of some terms associated with categories and/or the addition of terms to be included with existing categories. Additionally or alternatively, new categories may be added to the grouping dataset and terms to be associated with those categories.

In some embodiments, one or more machine learning models may extract terms from stories using various extraction techniques. Alternatively or additionally, the extraction of the terms may be based on a set of rules to apply to individual words and/or combinations of words. The machine learning models may use a support vector machine, logistic regression, random forest, or an equivalent thereof. Additionally, or alternatively, the machine learning models may be a convolutional neural network, a recurrent neural network, a recursive neural network, a long short-term memory (LSTM), a gated recurrent unit (GRU), an unsupervised pre-trained network, a space invariant artificial neural network, or any equivalent thereof. In some embodiments, the machine learning models may be existing machine learning models. In further embodiments, the machine learning models may be proprietary models. Alternatively, the machine learning models may be modified from existing machine learning models such that the machine learning models become proprietary. In some instances, the machine learning models may be trained using different parameters, such as back propagation, transfer learning, stochastic gradient descent, learning rate decay, dropout, max pooling, batch normalization, long short-term memory, skip-gram, and/or any equivalent deep learning technique. According to some embodiments, the machine learning models may generate a first baseline feature vector for the first image component. The first baseline feature vector may be used for verification purposes (e.g., as the verified feature to which subsequent verification attempts may be compared). In practice, the various computing devices and/or servers with the machine-learning models may classify terms from stories based on categories associated with terms from a grouping dataset and continue the training of stories until the machine-learning models are able to classify the stories with appropriate categories. This training phase may be based on matching terms from the grouping dataset with terms from the stories. While not all stories may have the exact terms matching those with categories in the grouping dataset, the machine learning classifier may attempt to match other terms found in categories stories with the terms of the uncategorized stories. The terms may comprise text in the stories, text relating to the titles of the stories, and/or text relating to (in the processing of emails or messages) the senders and receivers of the stories. Using this information, the machine-learning models may be trained or even further trained to refine the machine learning models.

In one or more embodiments, the computing devices and/or servers may use machine learning algorithms to perform the analysis of image information. The machine learning algorithms may be a neural network, such as a generative adversarial network (GAN) or a consistent adversarial network (CAN), such as a cyclic generative adversarial network (C-GAN), a deep convolutional GAN (DC-GAN), GAN interpolation (GAN-INT), GAN-CLS, a cyclic-CAN (e.g., C-CAN), or any equivalent thereof. The neural network may be trained using supervised learning, unsupervised learning, back propagation, transfer learning, stochastic gradient descent, learning rate decay, dropout, max pooling, batch normalization, long short-term memory, skip-gram, or any equivalent deep learning technique.

To assist with the explanation of the concepts described here, the disclosure includes the following sections: Classifying Text using Grouping Datasets; Selection Options; and Visual Summaries of Classifications.

Classifying Text Using Grouping Datasets

Figure 3:
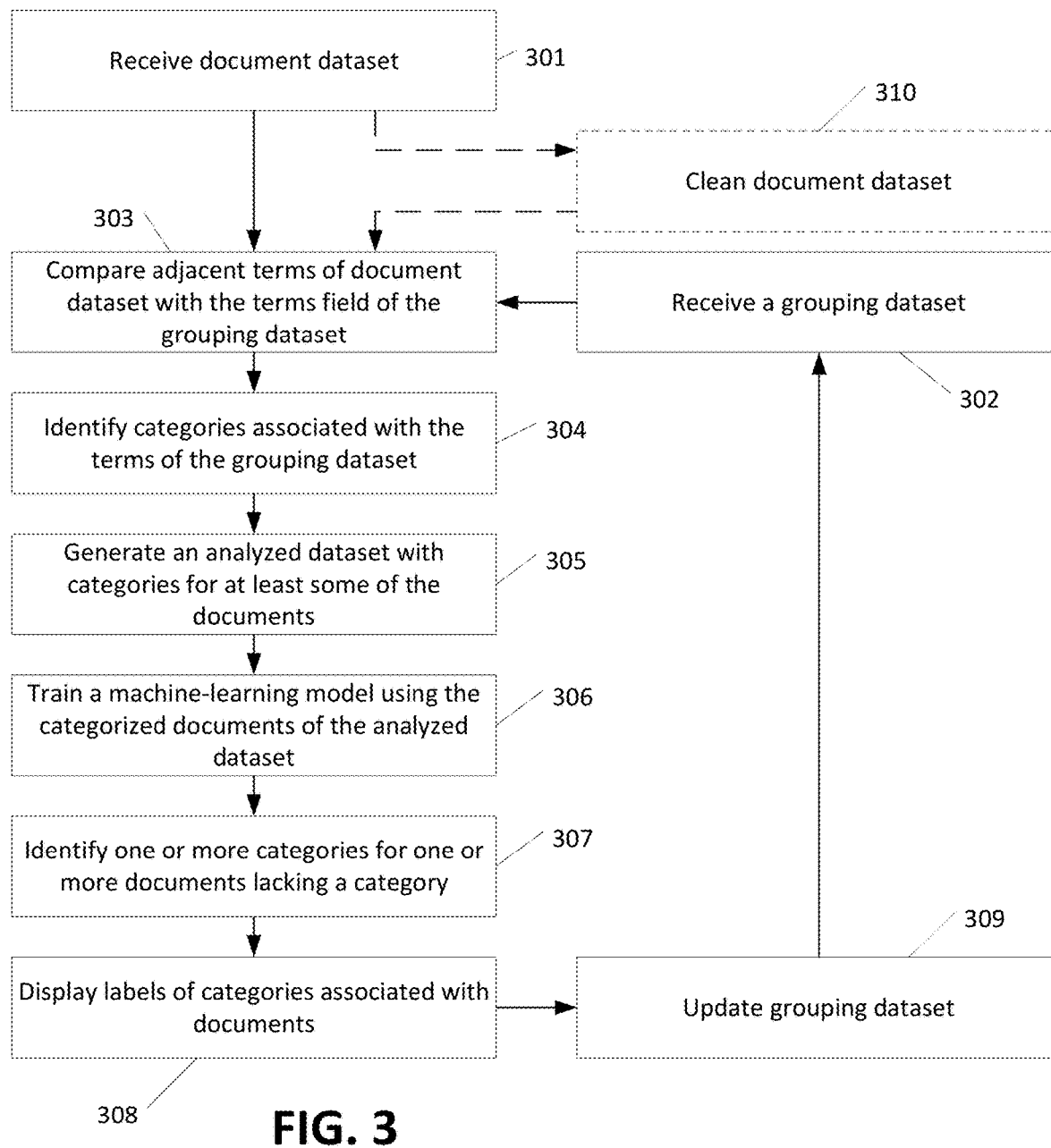
FIG. 3 depicts a block diagram showing various process flows for determining textual content of datasets.

FIG. 3 depicts a block diagram showing various process flows for determining the textual content of datasets. In step 301, a document dataset may be received. In step 302, a grouping dataset may be received. The grouping dataset may comprise one or more categories to be applied to the document dataset. In step 303, adjacent terms of the document dataset may be compared with the terms field of the grouping dataset. In step 304, one or more categories may be identified for the terms in the document dataset where the terms match. For instance, for each story in the document dataset, the story may comprise a plurality of terms. Based on those terms matching the terms of the grouping dataset, a story may be associated with one or more categories associated with the matching terms. In some examples, one or more stories may not be associated with a category. In step 305, an analyzed dataset with categories for at least some of the documents may be generated. In step 306, a machine-learning model may be trained using the categorized documents of the analyzed dataset. In step 307, the machine-learning model may identify one or more categories for one or more documents lacking a category. In step 308, a user interface may be generated that displays labels associated with the categories of the documents. In step 309, a user may modify the grouping dataset to modify the associations between terms and categories. For instance, the user may add terms to be associated with existing categories, may remove terms associated with existing categories, may remove categories, may add new categories and terms associated with the new categories, and the like. The modified grouping dataset may be provided to step 302 for retraining the machine-learning model based on the modified grouping dataset. Optionally, as shown in step 310, the document dataset received in step 301 may be cleaned to remove words of little value, normalize the terms in the stories, and/or replace some terms with others, and the like. The model may include a term frequency-inverse document frequency (TF-IDF) transformer. The TF-IDF model may further include a machine-learning classification algorithm such as a support vector machine (SVM) classifier.

The association of at least one category with a document may generate one point for that category for that document. The association of multiple categories with a document may generate multiple points corresponding to the respective categories associated with that document. The documents may be analyzed based on the quantity of points generated for each. For example, the points per category may permit a given document to be associated with two or more categories. When determining one or more metrics to compare the categories and/or documents, the points per category per document may be counted non-distinctly (e.g., if a document includes three sets of terms associated with a first category and one set of terms associated with a second category, the point count for the first category may be identified as "3" and the point count for the second category may be identified as "1"). This may permit an analysis of the documents with each document being identified with one or more categories, e.g., to permit an analysis of various themes that arise from the aggregation of the categories across the documents.

Alternatively or additionally, the points per category per document may be counted distinctly, e.g., identifying categories that occur at least once per document, regardless of the actual quantity of occurrences of terms per category per document. For the above example with the document having three occurrences of terms associated with the first category and one occurrence of terms associated with the second category, the point count for the first category may be identified as "1" and the point count for the second category may be identified as "1".

Alternatively or additionally, each document may be summarized as having exactly one category associated with it based on the category with the greatest quantity of points for that document. This may be referred to as ranking the importance of the categories by how often each occurs per document with the goal of determining exactly one category to be associated with the document.

Next, the quantities of points per category may be aggregated across the documents as desired to analyze how the various categories appear in the set of documents.

Figure 4:
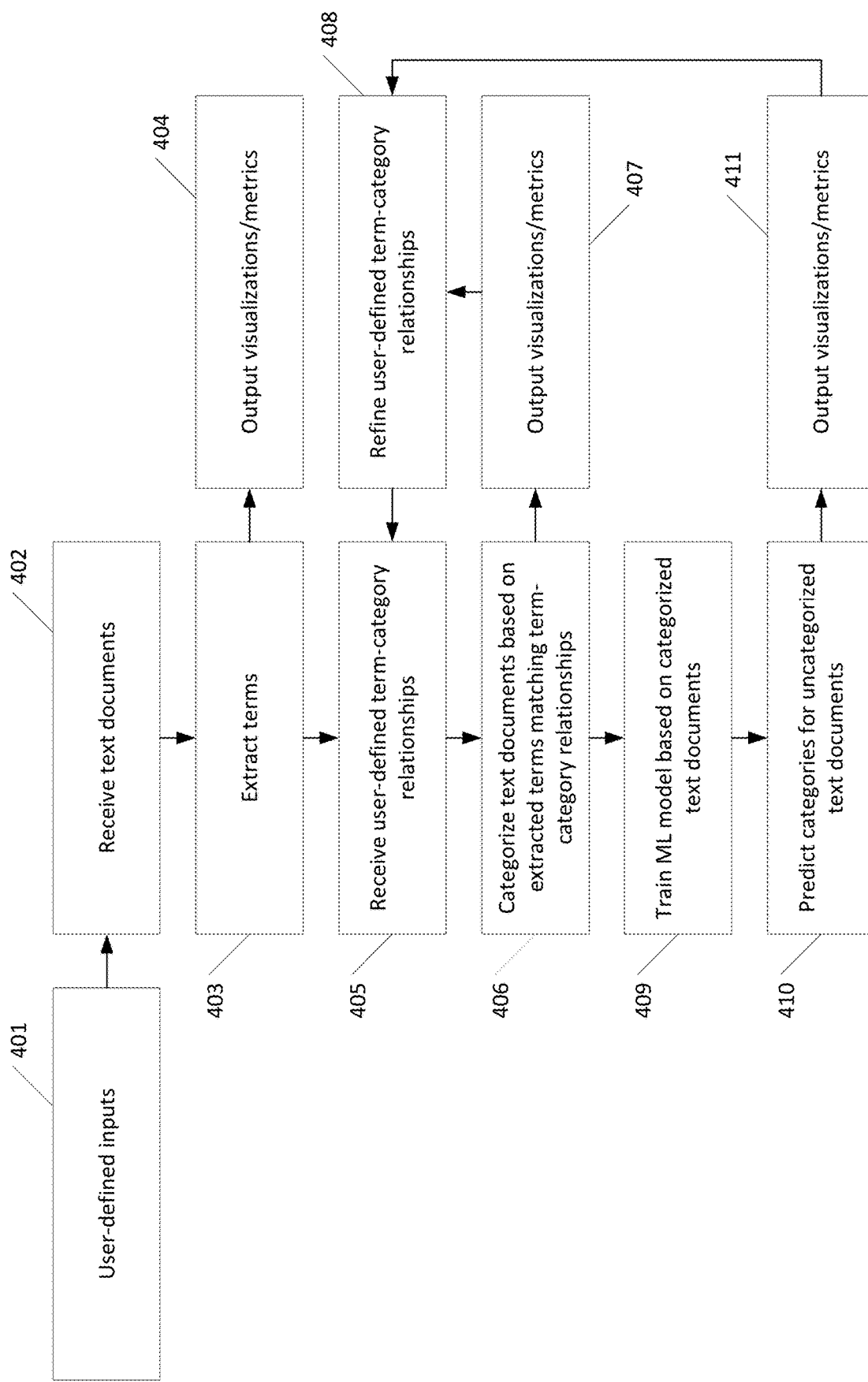
FIG. 4 depicts a block diagram showing various process flows for determining textual content of datasets including the display of visualizations and/or metrics associated with the identified content.

FIG. 4 depicts a block diagram showing various process flows for determining textual content of datasets including the display of visualizations and/or metrics associated with the identified content. In step 401, user-defined inputs may be received by the system. The user-defined inputs may include various selections comprising, for instance, a length of the n-grams (e.g., 1, 2, 3, or more words) and/or other settings. Additionally or alternatively, an initial dataset of user-identified term-category relationships may be received in step 401. In step 402, one or more files with text documents may be received by the system. In step 403, the system may extract terms from the text documents. In step 404, the system may output visualizations and/or metrics regarding the extracted terms. The initial output of visualizations and/or metrics in step 404 may help a user better appreciate how the terms may be extracted in step 403. In step 405, the system may receive user-identified term-category relationships. If step 401 included an initial set of the user-identified term-category relationships, step 405 may be eliminated for at least a first pass of the process of FIG. 4. If step 401 did not include an initial set of the user-identified term-category relationships, the user-identified term-category relationships may be received in step 405. In step 406, the system may categorize the text documents based on extracted terms matching the term-category relationships. In step 407, the system may output various visualizations and/or metrics to a user interface to provide the user a status of how the text documents were categorized using the extracted terms-category relationships. In step 408, a user may refine the user-defined term-category relationships. The user refinements may include removing associations between terms and categories, adding associations between terms and categories, and/or modifying existing associations between terms and categories. In one or more examples, a user may refine user-defined term-category relationships by further segmenting existing categories into additional categories while including an order by which categories may be prioritized. For instance, if a text document received in step 402 comprises various combinations of terms that are associated with two or more categories, the identification of the categories may include the priority order, such that categories having a higher prioritization are selected over categories having a lower prioritization.

Additionally or alternatively, the categories may be associated with the document without prioritization, and analyses may be conducted across the documents based on the categories appearing across the collection of documents. For instance, the categorization of a given document may comprise a single categorization (e.g., category) and/or multiple categorizations without prioritization of the categories. Additionally or alternatively, the categorization may comprise a primary categorization followed by at least a secondary categorization and, possibly, further categorizations.

A quantity of documents may exist that do not fit into the existing user-defined term category relationships as specified in step 401 and/or in step 405. In a first example, the user may continually attempt to refine the user-defined term-category relationships in step 408 to provide categories for all documents. However, a quantity of text documents may quickly surpass the ability of a user to keep up with the influx of the documents. As a second and further examples, a machine learning model may be trained, in step 409, based on the existing categorization of text documents as categorized in step 406. In step 410, the machine learning model may predict one or more categories for the previously uncategorized documents. In step 411, the system may output visualizations and/or metrics for the user to review the predicted categories of the uncategorized documents from the machine learning model. In one example, the user may be satisfied with the training of the machine learning model and the process of FIG. 4. In another example, the user may attempt to further refine the user-defined category-term relationships in step 408 and repeat the process.

In one example, the machine learning model, trained in step 409, may be saved for future predictions based on new and/or replacement text documents. In another example, the trained machine learning model of step 409 may, instead, not be saved and only trained anew for new sets of text documents and user-defined term-category relationships. A benefit of not saving the machine-learning model may include preventing existing biases from cascading into future trained machine-learning models. Another benefit of not saving the trained machine-learning model includes the categorizations that may be changed and/or updated and the machine-learning model relearns from the new and updated training data.

Selection Options

Figure 5:
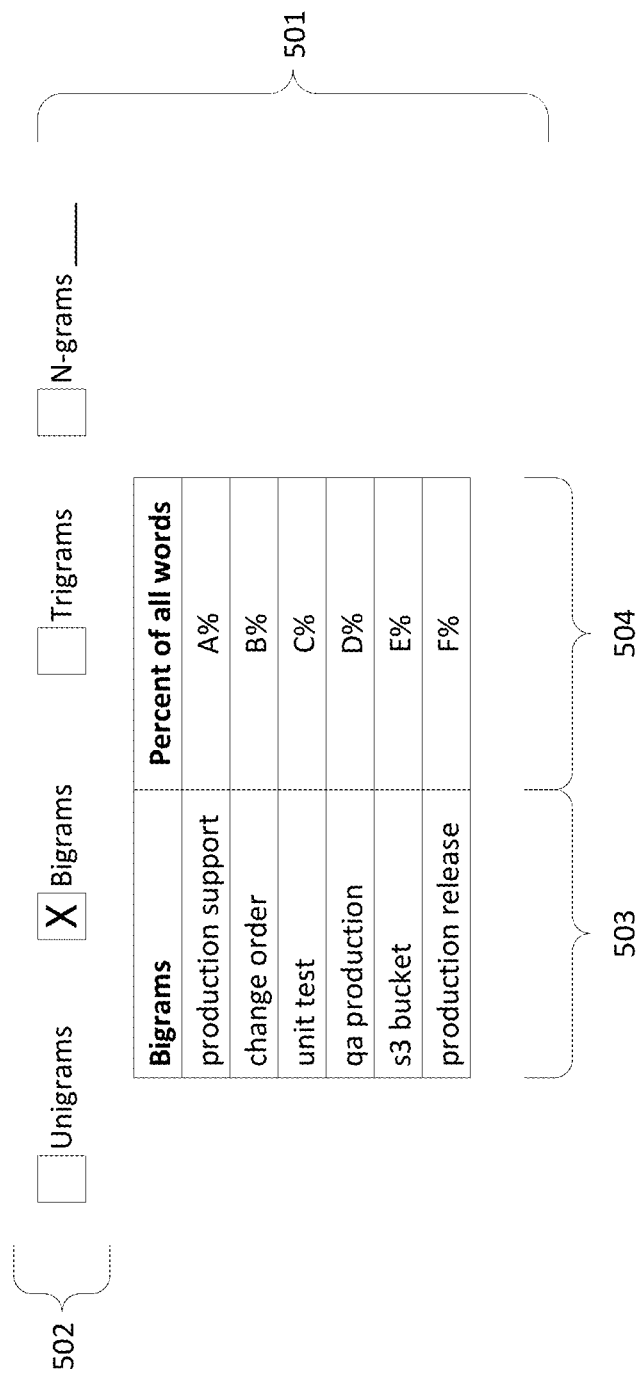
FIG. 5 depicts an example user interface and analysis of a content of a document.

FIG. 5 depicts an example user interface and analysis of the content of a document. The user interface 501 may include selection options in region 502 permitting one to select a length of each n-gram. For instance, the n-grams may comprise a single word (represented by the "Unigrams" option), two words (represented by the "Bigrams" option), three words (represented by the "Trigrams" option), and/or four or more words (represented by the "N-grams" option with the ability to designate the number of words). In one example, only a specific length of n-grams may be used (only bigrams, only trigrams, etc.). Alternatively, combinations of n-grams of different lengths may be used (e.g., no unigrams or 4+-grams but only bigrams and trigrams). Based on the selection of the n-gram length or lengths of region 502, examples of the selected n-grams may be provided in column 503, and a corresponding percentage of all words (or of similar length n-grams) matching that a specific n-gram may be provided in column 504.

FIG. 6 depicts a list of terms and one or more categories for the terms. For instance, column 601 includes a list of terms and column 602 includes a primary category/group associated with the terms of column 601. As used herein, the term "category/group" is used to describe categories associated with categories and/or groups. In one example, the categories may all refer to terms that may appear in any of the documents. In another example, the categories may be specific to a particular categorization. For example, a category may refer to a genus of terms while a group may refer to a species of terms. In another example, a category may refer to a project while a group may refer to issues associated with projects and/or remediation possibilities. In general, the term "category/group" may generally be referred to as a "category" and/or "group" as relevant to a particular description.

In an example of FIG. 6 comprising only two columns, FIG. 6 may comprise terms in column 601 and categories/groups in column 602 where each of the categories/groups of column 602 has the same level of priority. In an example of FIG. 6 comprising three or more columns, the additional columns may include a second category/group column 603 associated with the terms of column 601. Additionally or alternatively, the third column may comprise a ranking column 604 that provides a prioritization of the order in which the primary category group column 602 is to be applied to the terms of column 601. In yet a further example, both the secondary category group column 603 and the ranking column 604 may be used in combination with the terms column 601 and primary category/group column 602 to provide both primary and secondary categorizations of terms as well as a ranking to be applied to those categorizations.

Figure 7:
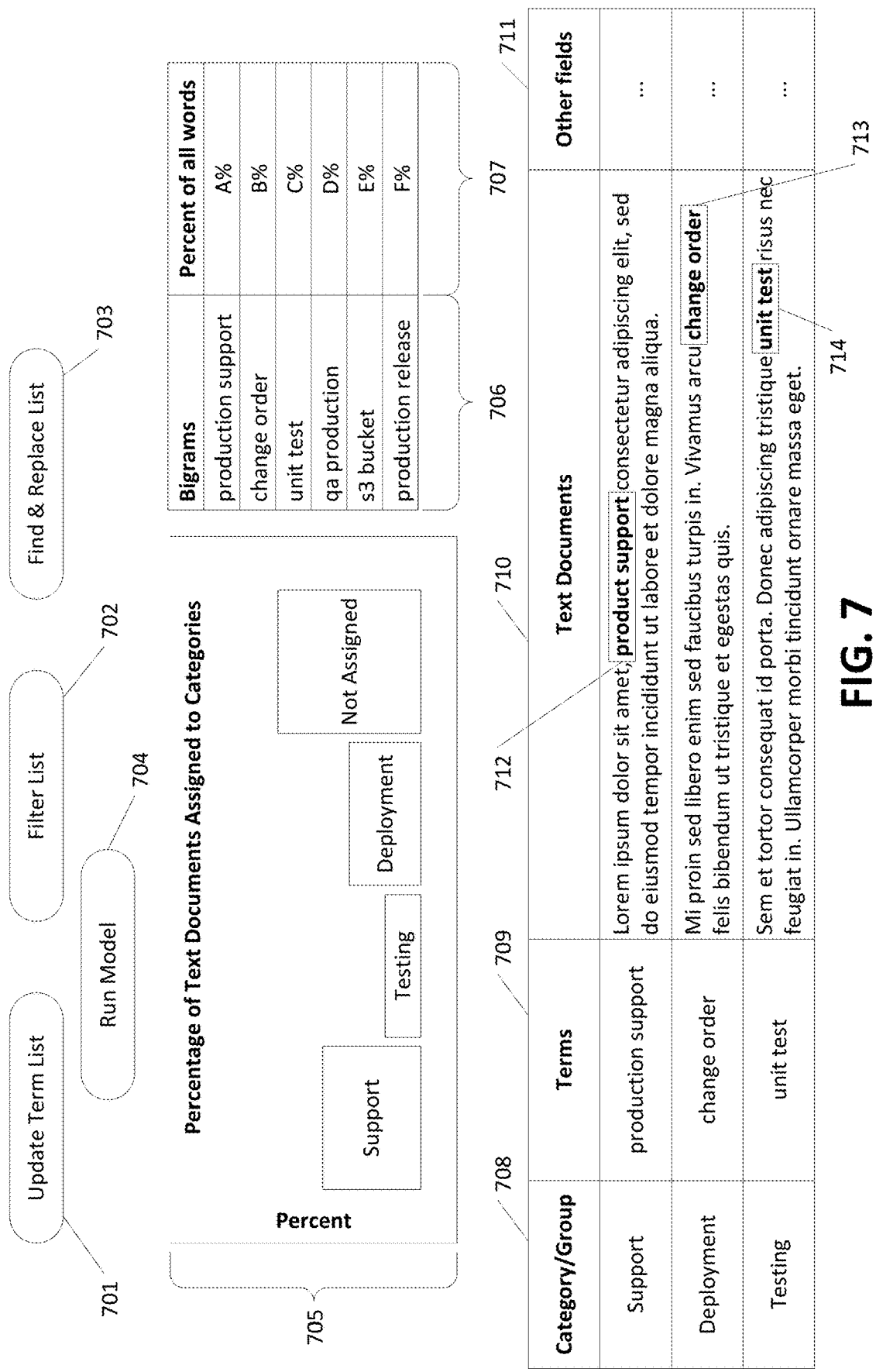
FIG. 7 depicts an example user interface identifying how text documents are processed based on an existing categorized list of terms before including predictions from a machine-learning model.

FIG. 7 depicts an example user interface identifying how text documents may be processed based on an existing categorized list of terms before including predictions from a machine-learning model. FIG. 7 comprises a list of selectable user options, a graphical portion describing the selections, and examples of various categorizations. The list of selectable user options may comprise a region 701 permitting a user to update a term list, a region 702 permitting a user to filter the term list to be applied, a region 703 permitting a user to find and replace one or more terms and/or categories in the list, and/or a region 704 permitting a user to train the machine learning model on the new term list and predict categories/groups based on the new term list.

FIG. 7 may comprise a graphical region 705 representing a percentage of text documents assigned to categories. In the example of FIG. 7, the category with the greatest quantity of text documents is "Support," followed by "Deployment," and "Testing." However, the highest quantity of documents of the region 705 comprises documents that have not been assigned to at least one category. Column 706 may provide a list of bigrams and column 707 may provide a list of percentages of all words found across the documents. A lower portion of FIG. 7 may include one or more examples of how categories/groups were assigned based on terms having been found in text documents. For instance, column 708 may provide a list of categories/groups, column 709 may provide a list of terms associated with the category/group of column 708, column 710 may provide examples of text documents having been categorized based on particular terms, and column 711 may provide other fields. Referring specifically to the text documents in column 710, the first text document has been categorized as relating to "Support" based on the existence of the terms "production support" having been found in the text document (e.g. highlighted with bold and a surrounding outline 712). Similar text documents in column 710 may be identified as relating to categories/groups 708 based on terms 713 and 714 corresponding to the terms of column 709.

Figure 8:
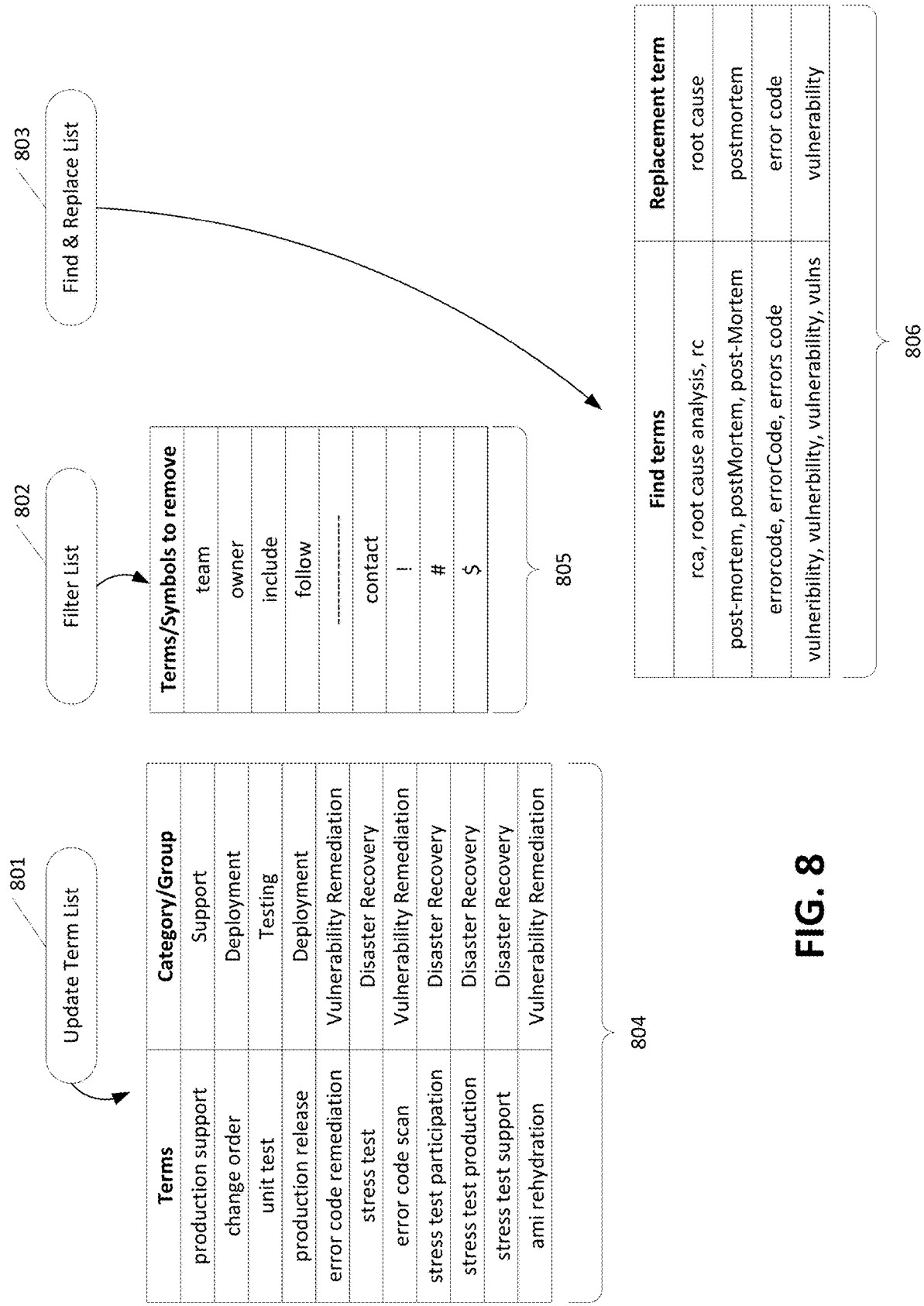
FIG. 8 depicts a process flow for updating a list of terms, updating a list of filters, and/or updating a find and replace list of terms.

FIG. 8 depicts a process flow for updating a list of terms, updating a list of filters, and/or updating a find and replace list of terms. FIG. 8 provides another example of a user interface where a user may refine how terms may be extracted and/or text cleaned as shown in step 310 of FIG. 3 and/or step 403 of FIG. 4 or further refine the list of terms and categories as shown in step 408 of FIG. 4. The user interface of FIG. 8 may comprise a first region 801 that, upon selection, permits a user to modify the list of terms and corresponding categories/groups of table 804. The user interface may also comprise a region 802 that, upon selection permits a user to modify a list of terms and/or symbols to remove as shown in table 805. The user interface of FIG. 8 may further comprise a region 803 that, upon selection, may permit the user to modify the substitution of first terms for second terms as shown in the terms to be found and corresponding replacement terms of table 806.

Figure 9:
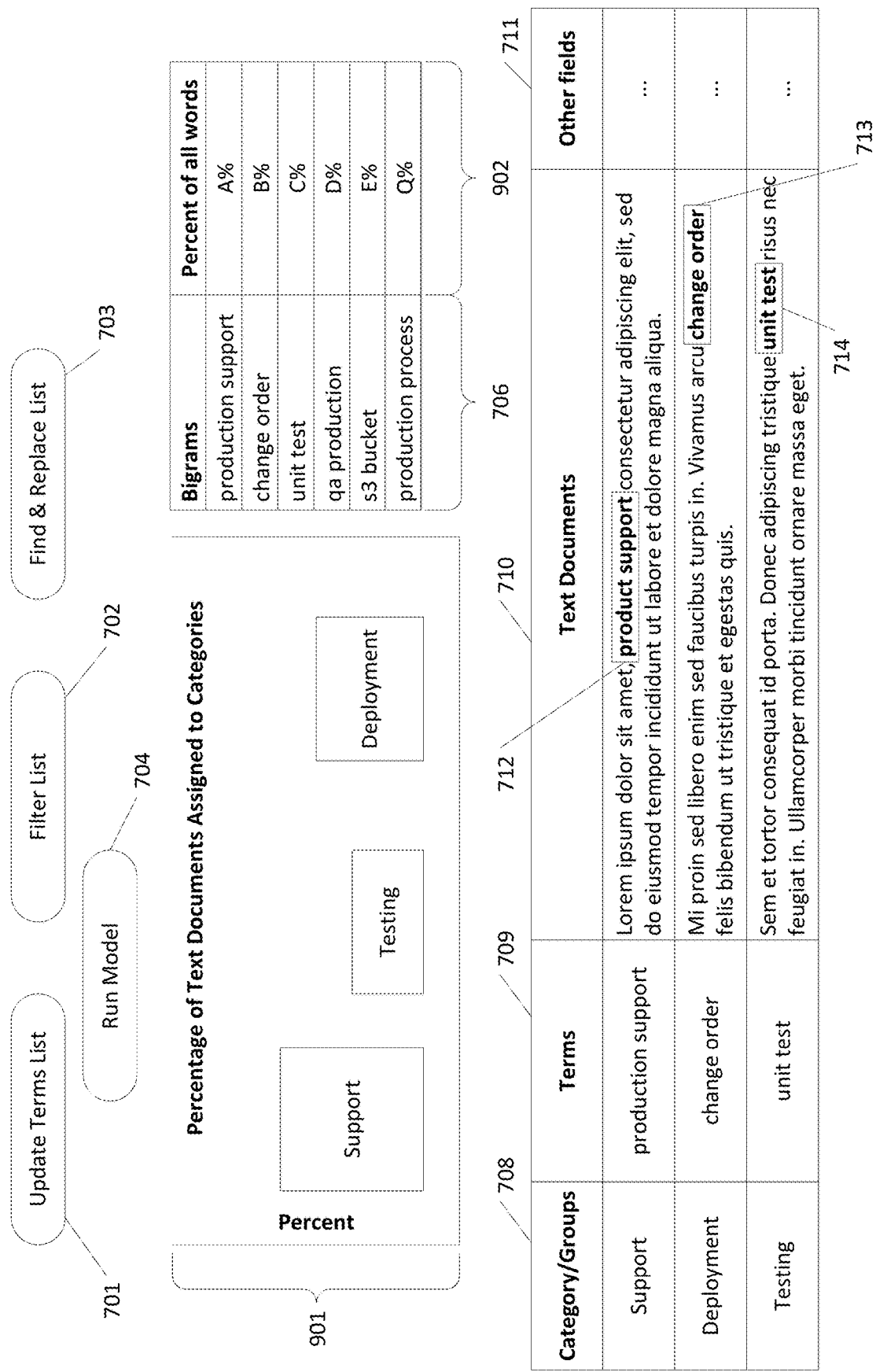
FIG. 9 depicts an example user interface identifying how text documents are processed based on an existing categorized list of terms after including predictions from a machine-learning model.

FIG. 9 depicts an example user interface identifying how text documents may be processed, for example, based on an existing categorized list of terms after including predictions from a machine-learning model. FIG. 9 provides an updated version of the user interface of FIG. 7 where the user executed the machine-learning model to categorize any text documents not assigned to categories based on terms. This may be helpful when modifying the tables of FIG. 8 do not eliminate all documents from the "Not Assigned" group. Like reference numbers are as described with reference to FIG. 7 above. In FIG. 9, the region 901 includes the "Support," "Testing," and "Deployment" percentages but the "Not Assigned" category no longer appears. Also, in column 902, a new bi-gram "production process" appears with a percentage of all words "Q %." A user may have added new terms including "production process" and assigned categories to each. Also, a new bi-gram may appear if more cleaning is performed (e.g. may be a term is removed or synonyms are added to the Find and Replace List of FIGS. 5, 7, and/or 9) and the term frequency of the new term and/or synonym is calculated. By providing new terms, the machine-learning model may leverage associations between categories/groups and the terms with other common terms found in categorized documents to predict categories/groups to be associated with the documents lacking specific combinations of terms found in the list of terms.

Figure 10:
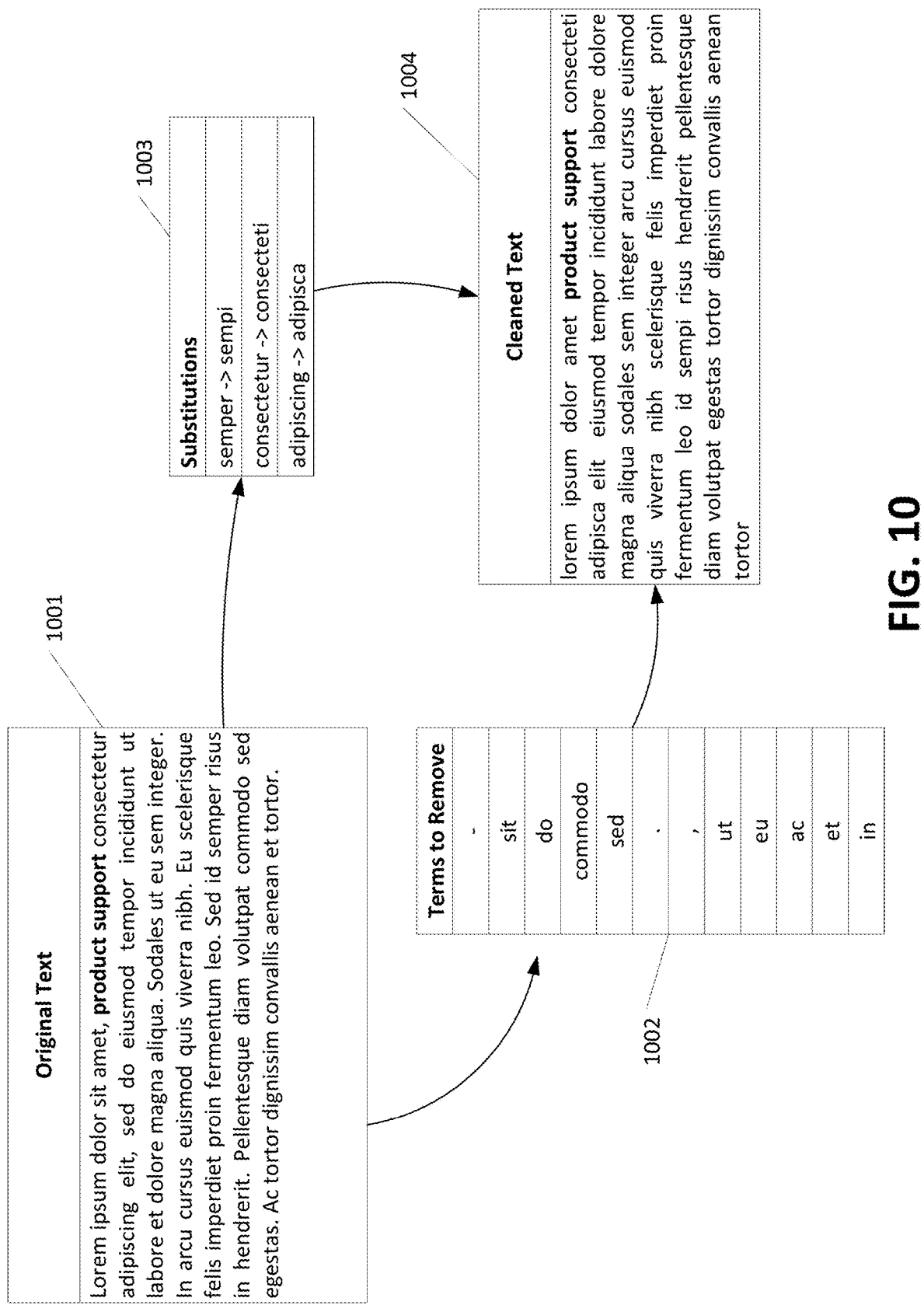
FIG. 10 depicts an example of text being prepared.

FIG. 10 depicts an example of text being prepared. For a given document 1001, terms to remove are shown in table 1002 and substitutions are found in table 1003. A cleaned version of the document 1001 is shown as document 1004 with various terms removed and various substitutions made.

Figure 11:
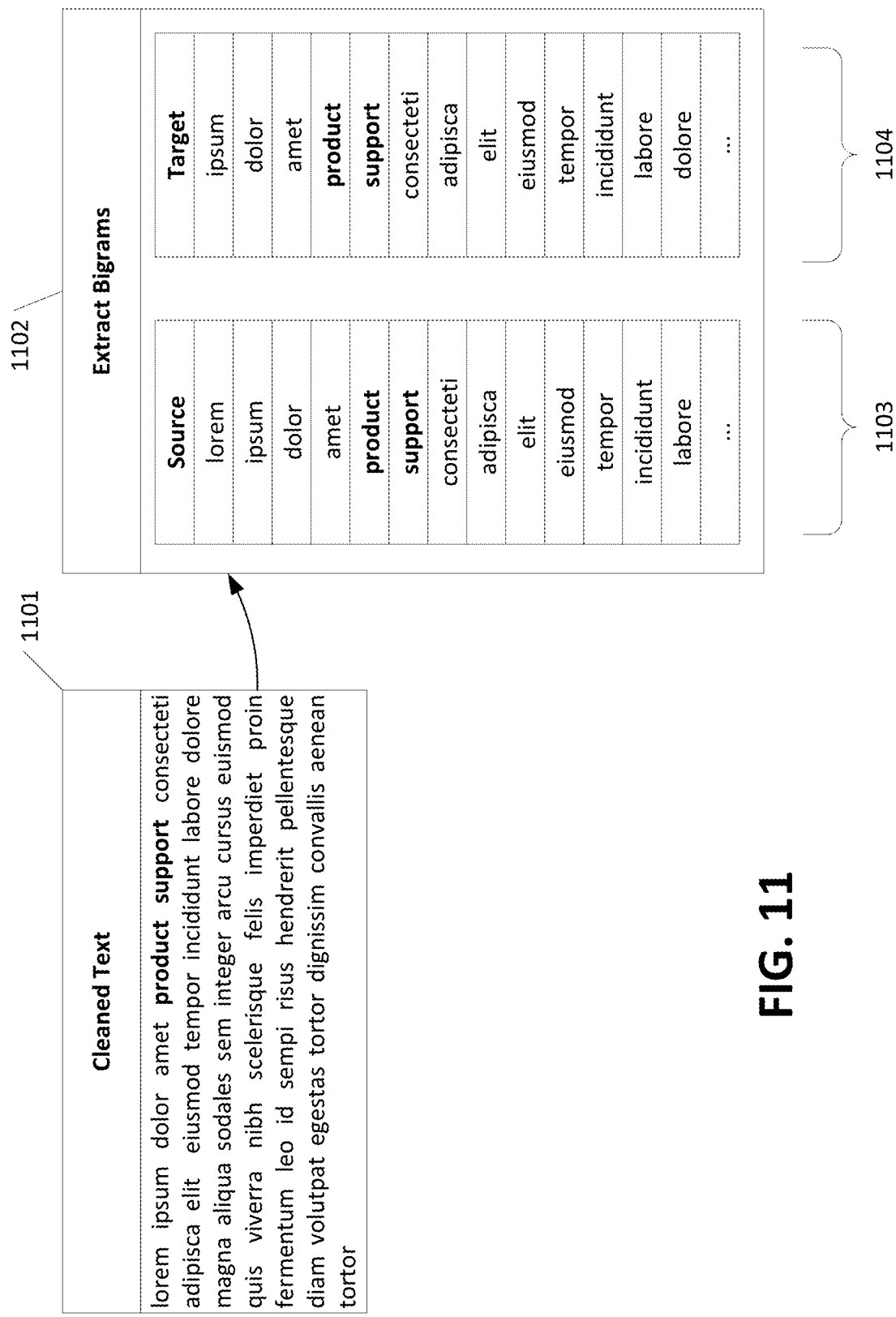
FIG. 11 depicts an example of an extraction of bigrams from prepared text.

FIG. 11 depicts an example of an extraction of bigrams from prepared text. A document 1101 of cleaned text may be processed to extract the specified type of n-grams desired by the user. In the example of FIG. 11, the user has specified that two-word terms, bigrams, are to be prepared from the cleaned text of the document 1101. The process creates the bigrams as table 1102 with a list of terms as column 1103 with the following terms as column 1104.

Visual Summaries of Classifications

FIGS. 12-15 depicts various user interfaces of examples of analyses of collections of documents.

Figure 12:
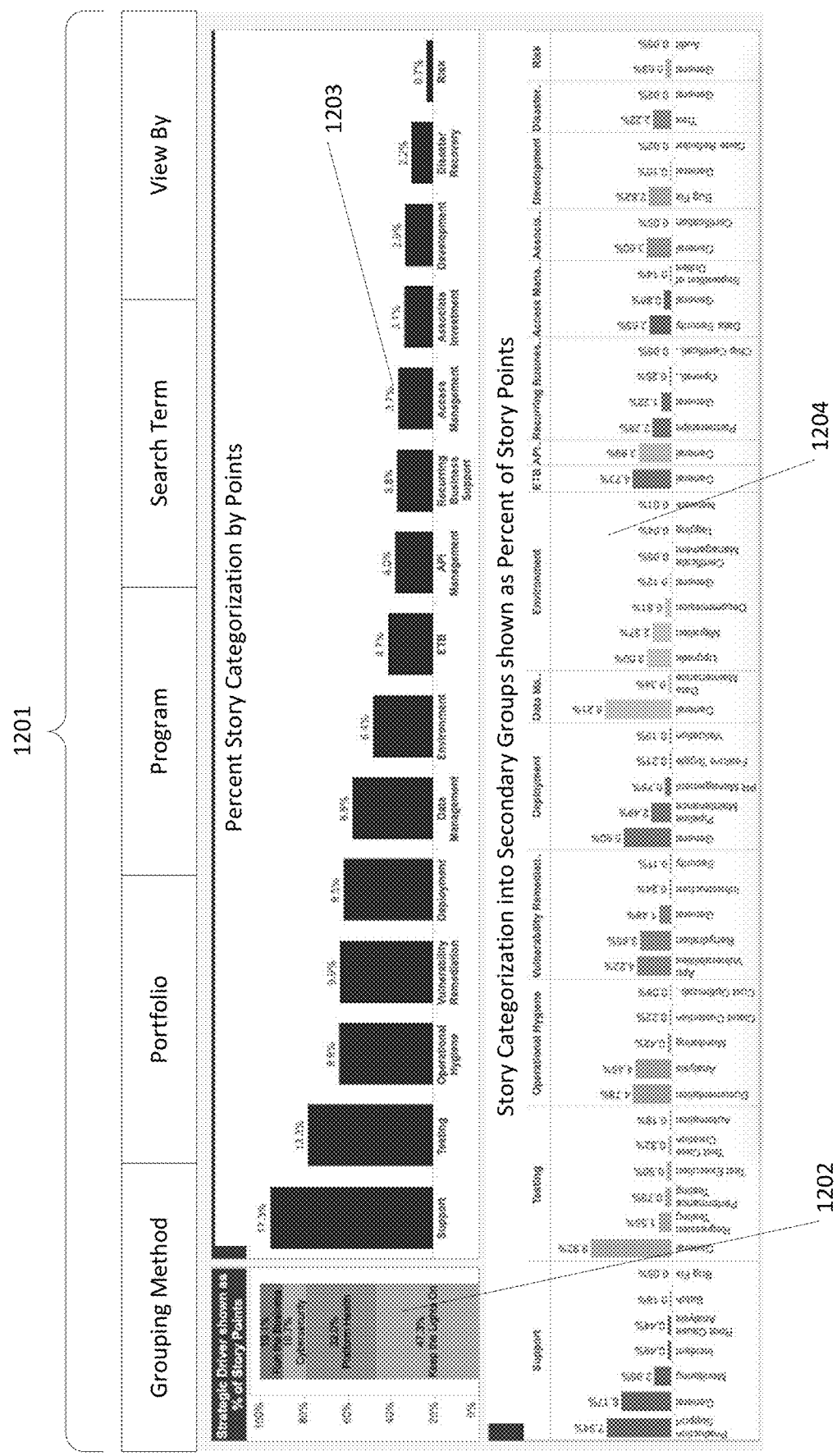
FIGS. 12-15 depicts various user interfaces of examples of analyses of collections of documents.

FIG. 12 provides a user interface with various selectable options. The options provided in region 1201 may permit a user to perform one or more of selecting a grouping method, identifying a portfolio of documents, identifying a program associated with the portfolio, performing searches for individual terms, and or identifying which metrics and/or visualizations are to be provided. Region 1202 may comprise a visualization showing a high-level category associated with the categorized documents. As shown in region 1202, the high-level category is shown as a "strategic driver." The high-level category of region 1202 may comprise a primary category/group with associated terms (e.g., a primary category/group 602 of FIG. 6). Additionally or alternatively, the high-level category of region 1202 may be a summarization of other primary categories/groups. By grouping various primary category/group categories together, the strategic driver graphic may provide a higher-level summary than a listing of the primary category/group categories. Region 1203 provides a bar graph of the number of points per text document (e.g., per story). Region 1204 provides multiple bar graphs identifying, for each primary category/group, the most common second categories/groups.

Figure 13:
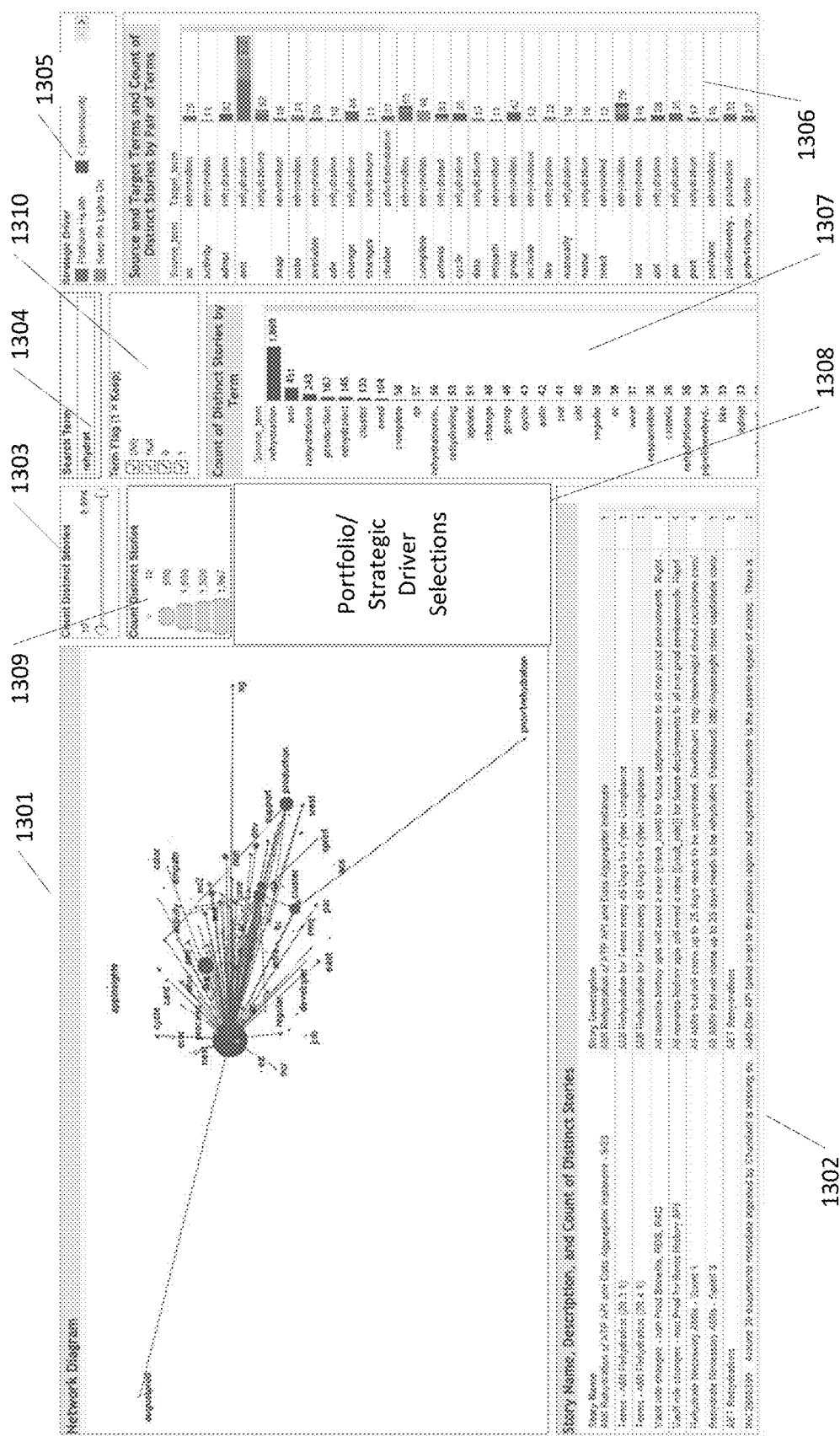

FIG. 13 provides another user interface providing visualizations and/or metrics to the user. Region 1301 represents a network diagram of relationships between terms in the n-grams of the documents. The size of each node may be scaled based on the quantity of occurrences of the term in the documents and/or on the quantity of occurrences of the term in the n-grams found in the documents. Region 1302 may comprise information regarding various text documents (e.g., stories) including their names, descriptions of their contents (which may comprise a list of the assigned categories), and, possibly, counts of distinct stories in each. For instance, an email thread may appear once in region 1302 but may comprise a number of individual emails summarized as the quantity in the third column of region 1302. Region 1303 may comprise a selector permitting the selection of a range of distinct stories to be included in the visualization of region 1301. Region 1304 may permit one to search for an individual term. Region 1305 may be a legend for bar graph 1306 representing categories assigned to the n-grams (here, bigrams). Region 1307 may be a bar graph that identifies a count of distinct stories by assigned categories. Region 1308 may permit the selection of the gross types of portfolios/strategic driver selections (e.g., groups of the primary categories/groups). Region 1309 represents a legend for the size of the nodes of region 1301 and region 1310 permits identification of how to handle terms searched for in region 1304 (e.g., all/null/0—where the term does not appear per story/1—where the term does appear per story). The portfolios/strategic driver groupings may be specified in the user-defined inputs of step 401 of FIG. 4.

Figure 14:
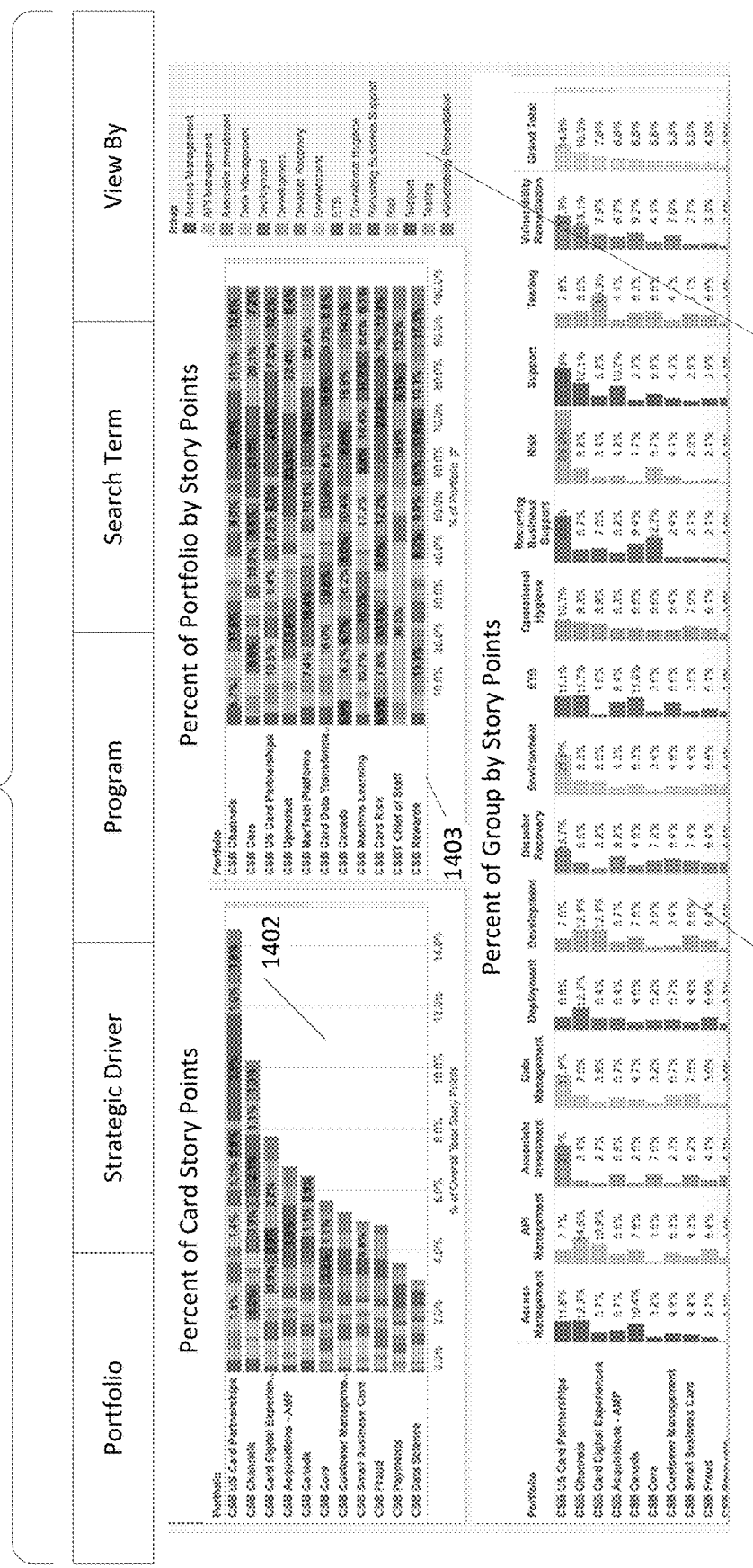

FIG. 14 provides another user interface providing visualizations and/or metrics to the user. The options provided in region 1401 may permit a user to identify a portfolio of documents, select a strategic driver (e.g., group of primary classifications/groups), identifying a program associated with the portfolio, perform searches for individual terms, and/or identify which metrics and/or visualizations are to be provided. Region 1402 is a bar graph of the percentage of story points across all documents. Region 1403 is a bar graph of a percent of story points per portfolio. Region 1404 is multiple bar graphs of primary and secondary categories/groups per portfolio. Region 1405 may provide a legend for the various portfolios/strategic drivers.

Figure 15:
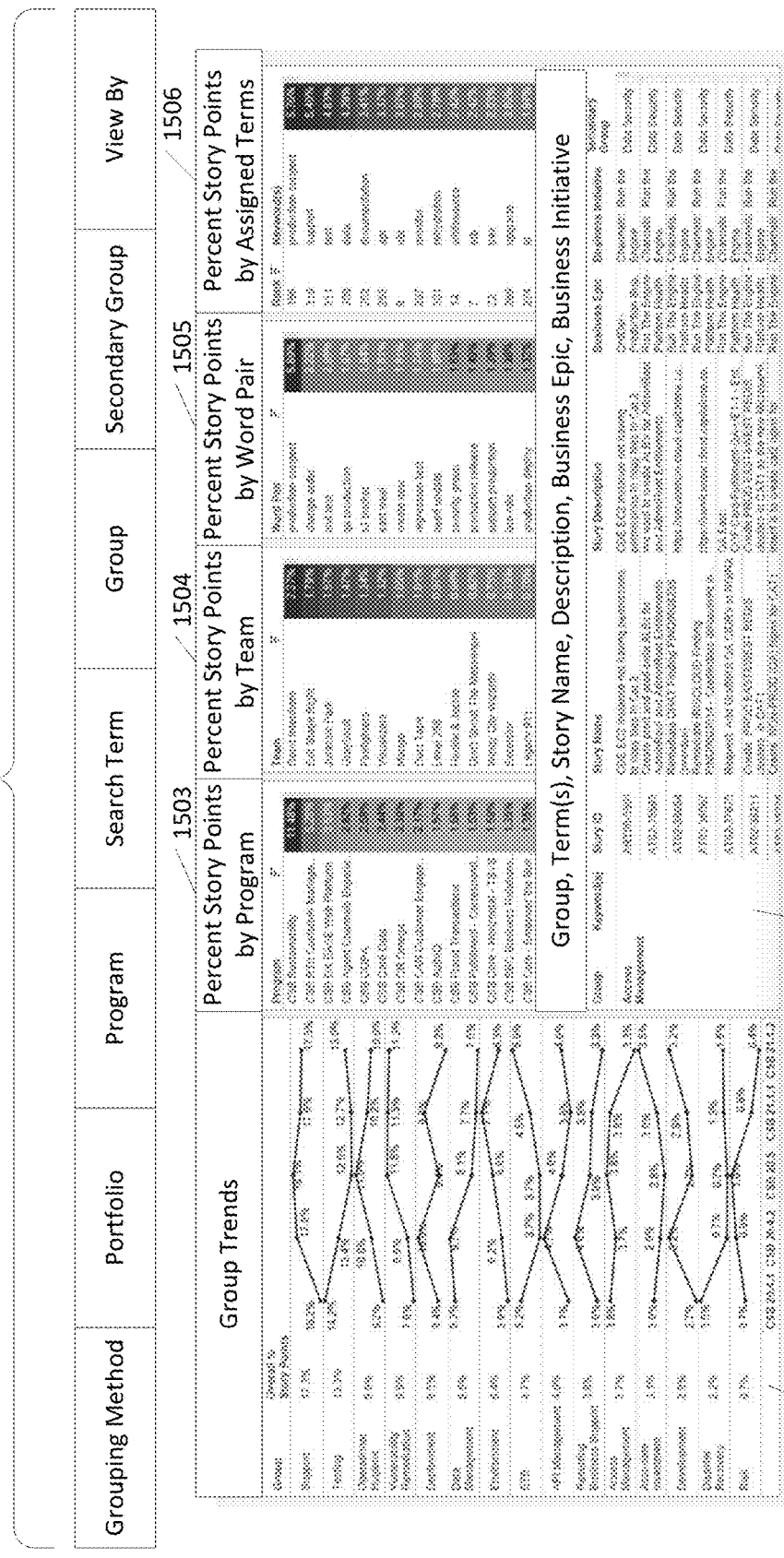

FIG. 15 provides another user interface providing visualizations and/or metrics to the user. The options provided in region 1501 may permit a user various options including selecting a grouping method, identifying a portfolio of documents, selecting a strategic driver (e.g., group of primary classifications/groups), identifying a program associated with the portfolio, performing searches for individual terms, selecting various secondary groups to view/hide, and/or identifying which metrics and/or visualizations are to be provided. Region 1502 provides a line chart showing how a quantity of overall story points per category/group changed over time. Region 1503 provides a table of story points per program. Region 1504 provides a table of story points per team (e.g., a working group of individuals). The identification of the working group members may be specified in the user-defined inputs of step 401 of FIG. 4. Region 1505 provides a table of story points by n-gram (here, by bigrams/word pairs). Region 1506 provides a table of story points by user-defined keywords (here, unigrams and bigrams) with the ability to sort by ranking information (e.g., the ranks assigned to the categories/groups). Region 1507 provides a table that displays various combinations of groups, terms, story-identification information, story names, story descriptions (e.g., a list of all labels associated with categories and/or entered separately by users), an identification of the combination of stories (e.g., a story epic comprising multiple stories), a business initiative, and/or secondary group.

Some implementations described herein relate to a computer-implemented method for the classification of text documents using a term model and a machine-learning model incorporating both user inputs and user feedback. The computer-implemented method may include receiving a grouping dataset comprising a terms field and a group field, wherein the group field comprises categories associated with terms in the terms field, and comparing adjacent terms of a first dataset with the terms field of the grouping dataset. The first dataset may comprise a plurality of documents. The method may further comprise identifying, for each of the plurality of documents and based on at least one adjacent term matching at least one term in the terms field, a category associated with the at least one term of the grouping dataset and generating a second dataset that may comprise one or more categories for each of the plurality of documents. The second dataset may comprise a subset of the plurality of documents that are not associated with the one or more categories. The method may further include training a machine-learning model using the second dataset, identifying, based on the trained machine-learning model, a category for each document in the subset, and causing one or more labels associated with categories to be displayed for the second dataset including the subset.

In some aspects, the computer-implemented method may further include receiving the plurality of documents, wherein each document may comprise a name and a description and cleaning, via one or more processors, each description of each document, resulting in a cleaned document description, for each document, including a plurality of terms, associated with each document. The dataset may comprise a source field and a target field with the source field populated, from each document of the plurality of documents, with terms in the cleaned document description. The target field may be populated, from each document of the plurality of documents, with adjacent terms in the cleaned document description that immediately follow, in each document, the terms in the source fields.

In some aspects, the computer-implemented method may further include receiving an updated grouping dataset including the group field and the terms field, comparing adjacent terms of the first dataset with the terms field of the updated grouping dataset, and identifying, for each of the plurality of documents and based on at least one adjacent term matching at least one term in the terms field of the updated grouping dataset, a category associated with the at least one term of the updated grouping dataset. The method may further include generating a third dataset including one or more categories, from the updated grouping dataset, for each of the plurality of documents, wherein the third dataset may include a second subset of the plurality of documents that are not associated with the one or more categories from the updated grouping dataset. The method may further include training a machine-learning model using the third dataset, identifying, based on the trained machine-learning model, a category, from the updated grouping dataset, for each document in the second subset, and causing one or more labels associated with categories, from the updated grouping dataset, to be displayed for the third dataset including the second subset. The group field may further include second categories associated with the terms in the terms field.

In some aspects, the computer-implemented method may further include identifying, for each of the plurality of documents and based on at least one adjacent term matching at least one term in the terms field, a second category associated with the at least one term of the grouping dataset and generating a third dataset including one or more second categories for each of the plurality of documents. The third dataset may comprise a second subset of the plurality of documents that are not associated with the one or more second categories. The method may further include training a second machine-learning model using the third dataset, identifying, based on the second trained machine-learning model, a category for each document in the second subset, and causing one or more second labels associated with categories to be displayed for the third dataset including the second subset. The grouping dataset may further include a rank field.

In some aspects, the computer-implemented method may further include identifying, for each document in the second dataset and based on categories from the grouping dataset, a highest ranked category of each document in the second dataset. The causing the one or more labels associated with categories to be displayed may further include causing the label of the highest ranked category to be displayed for the documents of the second dataset. The first dataset may include bigrams, trigrams, and/or n-grams from terms in the plurality of documents. The first dataset may further include a name field and a document description field.

The identifying the category associated with the at least one term of the grouping dataset may be based on at least one adjacent term from at least one of the name field or the document description field. The first dataset may further include a plurality of document-specific datasets. The model may include a term frequency-inverse document frequency (TF-IDF) transformer. The TF-IDF model may further include a machine-learning classification algorithm such as a support vector machine (SVM) classifier.

Some implementations described herein relate to an apparatus comprising one or more processors and memory storing instructions that when executed by the one or more processors cause the apparatus to classify documents using a machine-learning model. The instructions may cause the apparatus to receive a grouping dataset comprising a terms field and a group field, wherein the group field comprises categories associated with terms in the terms field, and compare adjacent terms of a first dataset with the terms field of the grouping dataset. The first dataset may comprise a plurality of documents. The instructions may further cause the apparatus to identify, for each of the plurality of documents and based on at least one adjacent term matching at least one term in the terms field, a category associated with the at least one term of the grouping dataset and generate a second dataset that may comprise one or more categories for each of the plurality of documents. The second dataset may comprise a subset of the plurality of documents that are not associated with the one or more categories. The instructions may further cause the apparatus to train a machine-learning model using the second dataset, identify, based on the trained machine-learning model, a category for each document in the subset, and cause one or more labels associated with categories to be displayed for the second dataset including the subset.

In some aspects, the instructions may further cause the apparatus to receive the plurality of documents, wherein each document may comprise a name and a description and cleaning, via one or more processors, each description of each document, resulting in a cleaned document description, for each document, including a plurality of terms, associated with each document. The dataset may comprise a source field and a target field with the source field populated, from each document of the plurality of documents, with terms in the cleaned document description. The target field may be populated, from each document of the plurality of documents, with adjacent terms in the cleaned document description that immediately follow, in each document, the terms in the source fields.

In some aspects, the instructions may further cause the apparatus to receive an updated grouping dataset including the group field and the terms field, compare adjacent terms of the first dataset with the terms field of the updated grouping dataset, and identify, for each of the plurality of documents and based on at least one adjacent term matching at least one term in the terms field of the updated grouping dataset, a category associated with the at least one term of the updated grouping dataset. The instructions may further cause the apparatus to generate a third dataset including one or more categories, from the updated grouping dataset, for each of the plurality of documents, wherein the third dataset may include a second subset of the plurality of documents that are not associated with the one or more categories from the updated grouping dataset. The instructions may further cause the apparatus to train a machine-learning model using the third dataset, identify, based on the trained machine-learning model, a category, from the updated grouping dataset, for each document in the second subset, and cause one or more labels associated with categories, from the updated grouping dataset, to be displayed for the third dataset including the second subset. The group field may further include second categories associated with the terms in the terms field.

In some aspects, the instructions may further cause the apparatus to identify, for each of the plurality of documents and based on at least one adjacent term matching at least one term in the terms field, a second category associated with the at least one term of the grouping dataset and generate a third dataset including one or more second categories for each of the plurality of documents. The third dataset may comprise a second subset of the plurality of documents that are not associated with the one or more second categories. The instructions may further cause the apparatus to train a second machine-learning model using the third dataset, identify, based on the second trained machine-learning model, a category for each document in the second subset, and cause one or more second labels associated with categories to be displayed for the third dataset including the second subset. The grouping dataset may further include a rank field.

In some aspects, the instructions may further cause the apparatus to identify, for each document in the second dataset and based on categories from the grouping dataset, a highest ranked category of each document in the second dataset. The instructions causing the one or more labels associated with categories to be displayed may cause the apparatus to cause the label associated with the highest ranked category to be displayed for the documents of the second dataset. The first dataset may include bigrams, trigrams, and/or n-grams from terms in the plurality of documents. The first dataset may further include a name field and a document description field.

The identifying the category associated with the at least one term of the grouping dataset may be based on at least one adjacent term from at least one of the name field or the document description field. The first dataset may further include a plurality of document-specific datasets. The model may include a term frequency-inverse document frequency (TF-IDF) transformer. The TF-IDF model may further include a machine-learning classification algorithm such as a support vector machine (SVM) classifier.

One more non-transitory media may store instructions that, when executed by one or more processors, cause the one or more processors to perform steps comprising for classification of terms using a model. The steps may include receiving a grouping dataset comprising a terms field and a group field, wherein the group field comprises categories associated with terms in the terms field, and comparing adjacent terms of a first dataset with the terms field of the grouping dataset. The first dataset may comprise a plurality of documents. The steps may further comprise identifying, for each of the plurality of documents and based on at least one adjacent term matching at least one term in the terms field, a category associated with the at least one term of the grouping dataset and generating a second dataset that may comprise one or more categories for each of the plurality of documents. The second dataset may comprise a subset of the plurality of documents that are not associated with the one or more categories. The steps may further include training a machine-learning model using the second dataset, identifying, based on the trained machine-learning model, a category for each document in the subset, and causing one or more labels associated with categories to be displayed for the second dataset including the subset.

Other embodiments of this aspect include corresponding computer systems, apparatus, and computer programs recorded on one or more computer storage devices, each configured to perform the actions of the methods.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method comprising:
   receiving a first grouping dataset comprising a terms field, a group field, and a rank field, wherein the group field comprises categories associated with terms in the terms field;
   receiving a first document dataset comprising a first plurality of documents;
   comparing adjacent terms of text in the first plurality of documents with the terms field of the first grouping dataset;
   identifying, based on at least one adjacent term matching at least one term in the terms field, categories for a first subset of the first document dataset, wherein a second subset of the first document dataset comprises documents not associated with at least one category;
   training a machine-learning model using the documents of the first subset;
   predicting, based on the trained machine-learning model, categories for a third subset of documents from the second subset, wherein a fourth subset of the second subset comprises documents not associated with at least one category;
   identifying, for each document in the first subset and the third subset and based on categories from the first grouping dataset and the ranking field, a highest ranked category of each document in the first subset and the third subset;
   causing one or more labels associated with one or more categories to be displayed, based on the ranking field, for the first subset and the third subset;
   receiving a second grouping dataset;
   comparing adjacent terms of text in the first plurality of documents with the terms field of the second grouping dataset;

identifying, based on at least one adjacent term matching at least one term in the terms field, categories for a fifth subset of the first document dataset, wherein a sixth subset of the first document dataset comprises documents not associated with at least one category;

retraining, based on the fifth subset and the second grouping dataset, the machine-learning model;

predicting, based on the retrained machine-learning model, categories for the sixth subset; and outputting the predicted categories associated with the sixth subset.

2. The computer-implemented method of claim 1, wherein each document comprises a name and a description, the computer-implemented method further comprising:

cleaning, via one or more processors, each description of each document, resulting in a cleaned document description, for each document, comprising a plurality of terms, associated with each document, wherein the first document dataset comprises a source field and a target field, wherein the source field is populated, from each document of the first document dataset, with terms in the cleaned document description, and wherein the target field is populated, from each document of the first document dataset, with adjacent terms in the cleaned document description that immediately follow, in each document, the terms in the source fields.

3. The computer-implemented method of claim 1, wherein the group field further comprises second categories associated with the terms in the terms field, wherein the identifying the categories for the first subset further comprises identifying second categories for the first subset, and wherein the predicting the categories for the first subset and the third subset predicts second categories for the first subset and the third subset.

4. The computer-implemented method of claim 1, wherein the identifying the categories for the first subset is further based on the rank field, wherein the identifying the categories for the first subset further identifies a highest ranked category of each document in the first subset, and wherein the causing the one or more labels associated with the one or more categories to be displayed further comprises causing a label associated with the highest ranked category to be displayed for the documents of the first subset.

5. The computer-implemented method of claim 1, wherein the first subset comprises bigrams.

6. The computer-implemented method of claim 1, wherein the first subset comprises trigrams.

7. The computer-implemented method of claim 1, wherein the first subset comprises n-grams.

8. The computer-implemented method of claim 1, wherein the first document dataset further comprises a name field and a document description field, and wherein the identifying the categories for the first subset is further based on at least one adjacent term from at least one of the name field or the document description field.

9. The computer-implemented method of claim 1, wherein the first document dataset comprises a plurality of document-specific datasets.

10. The computer-implemented method of claim 1, wherein the machine-learning model comprises a term frequency-inverse document frequency (TF-IDF) transformer machine-learning model.

11. The computer-implemented method of claim 10, wherein the TF-IDF transformer machine-learning model further comprises a support vector machine (SVM) classifier machine-learning model.

12. An apparatus comprising:

one or more processors; and memory storing instructions that, when executed by the one or more processors, cause the apparatus to:

receive a first grouping dataset comprising a terms field, and a group field, and a rank field, wherein the group field comprises categories associated with terms in the terms field;

receive a first document dataset comprising a first plurality of documents;

compare adjacent terms of text the first plurality of documents with the terms field of the first grouping dataset;

identify, based on at least one adjacent term matching at least one term in the terms field, categories for a first subset of the first document dataset, wherein a second subset of the first document dataset comprises documents not associated with at least one category;

train a machine-learning model using the documents of the first subset;

predict, based on the trained machine-learning model, categories for a third subset of documents from the second subset, wherein a fourth subset of the second subset comprises documents not associated with at least one category;

identify, for each document in the first subset and the third subset and based on categories from the first grouping dataset and the ranking field, a highest ranked category of each document in the first subset and third subset;

cause one or more labels associated with one or more highest ranked categories to be displayed, based on the ranking field, for the first subset and the third subset;

receive a second grouping dataset;

compare adjacent terms of text in the first plurality of documents with the terms field of the second grouping dataset;

identify, based on at least one adjacent term matching at least one term in the terms field, categories for a fifth subset of the first document dataset, wherein a sixth subset of the first document dataset comprises documents not associated with at least one category;

retrain, based on the fifth subset and the second grouping dataset, the machine-learning model;

predict, based on the retrained machine-learning model, categories for the sixth subset; and output the predicted categories associated with the sixth subset.

13. The apparatus of claim 12, wherein each document comprises a name and a description, and wherein the instructions further cause the apparatus to:

clean, via one or more processors, each description of each document, resulting in a cleaned document description, for each document, comprising a plurality of terms, associated with each document, wherein the first document dataset comprises a source field and a target field, wherein the source field is populated, from each document of the first document dataset, with terms in the cleaned document description, and wherein the target field is populated, from each document of the first document dataset, with adjacent terms in the cleaned document description that immediately follow, in each document, the terms in the source fields.

14. The apparatus of claim 12, wherein the group field further comprises second categories associated with the terms in the terms field, wherein the identifying the categories for the first subset further comprises identifying second categories for the first subset, and wherein the predicting the categories for the first subset and the third subset predicts second categories for the first subset and the third subset.

15. The apparatus of claim 12, wherein the instructions to identify the categories for the first subset are further based on the rank field, wherein the instructions to identify the categories for the first subset further identify a highest ranked category of each document in the first subset, and wherein the instructions to cause the one or more labels associated with one or more second categories to be displayed further cause the apparatus to cause a label associated with the highest ranked category to be displayed for the documents of the first subset.

16. The apparatus of claim 12, wherein the first subset comprises bigrams.

17. The apparatus of claim 12, wherein the first subset comprises trigrams.

18. One or more non-transitory media storing instructions that, when executed by one or more processors, cause the one or more processors to perform steps comprising:

receiving a first grouping dataset comprising a terms field, a group field, and a rank field, wherein the group field comprises categories associated with terms in the terms field;

receiving a first document dataset comprising a first plurality of documents;

comparing adjacent terms of text in the first plurality of documents with the terms field of the first grouping dataset, wherein the first document dataset further comprises a name field and a document description field;

identifying, based on at least one adjacent term matching at least one term in the terms field, categories for a first subset of the first document dataset, wherein a second subset of the first document dataset comprises documents not associated with at least one category;

training a machine-learning model using the documents of the first document dataset;

predicting, based on the trained machine-learning model, categories for a third subset of documents from the second subset, wherein a fourth subset of the second subset comprises documents not associated with at least one category;

identifying, for each document in the first subset and the third subset and based on categories from the first grouping dataset and the ranking field, a highest ranked category of each document in the first subset and the third subset;

causing one or more labels associated with one or more categories to be displayed, based on the ranking field, for the first subset and the third subset;

receiving a second grouping dataset;

comparing adjacent terms of text in the first plurality of documents with the terms field of the second grouping dataset;

identifying, based on at least one adjacent term matching at least one term in the terms field, categories for a fifth subset of the first document dataset, wherein a sixth subset of the first document dataset comprises documents not associated with at least one category;

retraining, based on the fifth subset and the second grouping dataset, the machine-learning model;

predicting, based on the retrained machine-learning model, categories for the sixth subset; and outputting the predicted categories associated with the sixth subset.

\* \* \* \* \*